United States Patent [19]
Lipo et al.

[11] Patent Number: 5,272,429
[45] Date of Patent: Dec. 21, 1993

[54] AIR GAP FLUX MEASUREMENT USING STATOR THIRD HARMONIC VOLTAGE AND USES

[75] Inventors: Thomas A. Lipo; Julio C. Moreira, both of Madison, Wis.

[73] Assignee: Wisconsin Alumni Research Foundation, Madison, Wis.

[21] Appl. No.: 591,517

[22] Filed: Oct. 1, 1990

[51] Int. Cl.$^5$ ............................................. H02P 5/40
[52] U.S. Cl. ..................................... 318/808; 318/802
[58] Field of Search ............................... 318/798–811, 318/227, 228, 722–723

[56] References Cited

U.S. PATENT DOCUMENTS

| | | | |
|---|---|---|---|
| 4,023,083 | 5/1977 | Plunkett | 318/227 |
| 4,112,339 | 9/1978 | Lipo | 318/227 |
| 4,245,181 | 1/1981 | Plunkett | 318/805 |
| 4,280,085 | 7/1981 | Cutler et al. | 318/803 |
| 4,431,957 | 2/1984 | Chausse et al. | 318/805 |
| 4,441,064 | 4/1984 | Cutler et al. | 318/798 |
| 4,445,080 | 4/1984 | Curtiss | 318/798 |
| 4,450,398 | 5/1984 | Bose | 318/803 |
| 4,451,770 | 5/1984 | Boettner et al. | 318/757 |
| 4,503,377 | 3/1985 | Kitabayashi et al. | 318/807 |
| 4,573,003 | 2/1986 | Lipo | 318/722 |
| 4,585,982 | 4/1986 | Cooper et al. | 318/722 |
| 4,724,373 | 2/1988 | Lipo | 318/805 |
| 4,912,378 | 3/1990 | Vukosavic | 318/254 |

OTHER PUBLICATIONS

"A New Method for Rotor Time Constant Tuning in Indirect Field Oriented Control," by Julio C. Moreira and Thomas A. Lipo in IEEE Power Electronics Specialists Conference, 573–580 (Oct. 1, 1989).

"Low Cost Efficiency Maximizer for an Induction Motor Drive", by Julio C. Moreira, Thomas A. Lipo and Vladimir Blasko in IEEE Industry Appl. Soc. Ann. Meeting, 426–431 (Oct. 1, 1989).

"Direct Field Orientation Control Using the Third Harmonic Component of the Stator Voltage", Julio C. Moreira and Thomas A. Lipo in Intl. Conf. on Elec. Mach. Proc., 1237–1242 (Aug. 13, 1990).

"Modeling of Saturated AC Machines Including Air Gap Flux Harmonic Components", Julio C. Moreira and Thomas A. Lipo in IEEE Industry Applns. Soc. Ann. Meeting, 37–44 (Oct. 7, 1990).

IEEE Standard 112 (The Institute of Electrical and Electronic Engineers), "Test Procedures for Polyphase Induction Motors and Generators", pp. 1–32 (1984).

*Primary Examiner*—William M. Shoop, Jr.
*Assistant Examiner*—John W. Cabeca
*Attorney, Agent, or Firm*—Olson & Hierl, Ltd.

[57] ABSTRACT

Methods and apparatus are provided wherein air gap flux magnitude and relative position are determined from stator voltage harmonic components and stator current in operating alternating current machines having a stator, a rotor and an air gap therebetween. Such determinations have various uses, such as for efficiency control. Various new and improved efficiency controllers are provided which utilize these measurements.

18 Claims, 8 Drawing Sheets

AIR GAP FLUX MEASUREMENT USING STATOR THIRD HARMONIC VOLTAGE AND USES

FIELD OF THE INVENTION

This invention relates to methods and apparatus for determining air gap flux in an operating alternating current machine by using the third harmonic component of the stator phase voltage. The invention further relates to methods and apparatus for using the air gap flux in controller applications where machine operation, performance and efficiency are regulated.

BACKGROUND OF THE INVENTION

In an operating alternating current machine, it is known that a magnetic flux exists in the region of the air gap. However, so far as now known, it has not previously been known that air gap flux (and, in particular, the peak amplitude of the fundamental component of this flux and its angular position in the air gap as the flux rotates) could be accurately measured on an instantaneous basis by using some other machine characteristic, such as the third harmonic component of the stator phase voltage.

No simple and reliable technique or apparatus was previously known which, when used in combination with an operating alternating current machine, would reliably and automatically determine the peak amplitude and relative position of the air gap flux using only a sensed third harmonic component of the stator phase voltage.

Such instantaneously existing information about the peak amplitude and location of the air gap flux, or an electric signal representative thereof, would be very useful in any one of a variety of applications, particularly in control devices and methods for regulating alternating current motor variables. Moreover, such control devices would themselves also be new and very useful, as would be the methods associated with their operation and use.

Electric motors consume much of the electric power produced in the United States. For example, motors consume about two-thirds of the total U.S. electrical power consumption of about 1.7 trillion kilowatt-hours. Over 50 million motors are estimated to be in use in U.S. industry and commerce with over one million being greater than 5 horsepower (hp). Over 7500 classifications for induction motors exist in the size range of about 5 to 500-hp.

Although the efficiency of electrical machinery is improving, the efficiency of the typical squirrel cage induction motor ranges from about 78 to 95 percent for sizes of 1 to 100-hp. Thus, substantial energy savings can still be achieved. Energy can be saved in conventional constant speed applications when load conditions change considerably. Induction motor operation at normal operating conditions can result in high efficiencies by use of a favorable balance between copper and iron losses. Iron losses dominate at light loads. Thus, energy is saved by reducing motor magnetic flux at the expense of increasing copper losses so that an overall loss minimum can be maintained. However, the cost of the controller needed to adjust the motor flux is substantial.

In contrast to constant speed motor systems, variable speed induction motor systems characteristically involve variable torque loads over a range of speeds. Typical applications include compressors, pumps, fans and blowers such as occur in air conditioners, heat pumps, and the like. In these applications, improvement in operating efficiency is possible more economically because a controller for developing the optimum flux condition is derivable from the same converter that is used to vary the speed of the drive.

The art needs new and improved methods and apparatus for regulating the energy consumption of alternating current machines. The discovery of a reliable measuring technique for air gap flux makes possible a family of new and very useful devices and methods for regulating alternating current machine operation, performance and efficiency.

SUMMARY OF THE INVENTION

The present invention provides a method and apparatus for measuring the amplitude of the air gap flux including its fundamental and its third harmonic components and their relative rotational positions using the third harmonic voltage component. This is done in an alternating current machine operating under conditions of magnetic saturation of adjacent portions of stator and rotor components and also of approximate rated voltage.

In another aspect, the present invention provides methods and apparatus for using such measurements to accomplish various control functions associated with alternating current machine operation.

Thus, the present invention provides methods and apparatus for determining various alternating machine variables, such as output power, torque, slip gain, rotor time constant, rotor magnetic flux, and the like. Such determinations make possible various new alternating current machine controller devices and methods.

For example, one new method and associated apparatus maximizes the efficiency of an alternating current machine. Thus, the third harmonic component of phase voltage is measured from which the air gap flux is determined to provide the machine output power. The machine input power is measured and efficiency computed. This computation is then used to regulate the input power voltage and frequency so as to maintain a set power output from a minimum amount of input power.

Also, the present invention provides a method and apparatus for controlling the efficiency of an alternating current multiphase induction machine by computing the machine rotor torque. This can be done without directly measuring the rotor phase current by using the measured angular displacement between the third harmonic component of the stator phase voltage and the amplitude of one phase of the stator current. This can be accomplished, if desired, from the direct current link bus of an associated inverter that is used to regulate input voltage and frequency, and then using this computation to regulate the input voltage and frequency applied to the machine.

The present invention permits the output power of a motor to be adjusted so that the efficiency of the motor can be maximized. The torque of the motor can be determined from measurements of the stator current and the air gap flux together with the lag between the stator current flux and the air gap flux (also sometimes referred to as fundamental flux). This is given by the formula:

$$T = K |I_a| |\lambda_g| \sin \gamma$$

where T is the torque, K is a constant which is a function of the motor used, $|I_a|$ is the absolute value of the phase current to the stator, $|\gamma g|$ is the absolute value of the air gap flux and $\gamma$ is the phase displacement (lag) between the stator current and the air gap flux.

In accordance with the present invention, the three phase voltages of a stator of a three phase induction motor are summed together. The fundamental voltage components cancel each other out and the resultant wave contains mainly the third harmonic stator voltage components and high frequency components due to interaction between stator and rotor slots in the operating motor. The phase position and amplitude of the third harmonic component of stator voltage is representative of the phase position and amplitude of the air gap flux. If desired, the high frequency components can be used to determine the rotation rate (i.e., the speed) of the motor rotor.

The third harmonic of the air gap flux maintains a constant position with respect to the third harmonic component of the stator voltage and also to the fundamental of air gap flux. The third harmonic component can thus be used to determine the wave form and amplitude of the fundamental flux component or air gap flux.

By comparing the air gap flux with the current phase of the stator, the lag or phase displacement can be determined. The torque is then calculated as described above.

The efficiency of the motor can be determined by comparing the electrical input and mechanical output powers. The output power is the product of the torque and shaft speed, which is also determined as described above.

The resulting determination of efficiency can then be used to adjust the field of the motor as needed to increase efficiency. The desire is to adjust the flux producing component to produce the minimum input power for a fixed amount of output power. The output power may be either a fixed speed or torque as desired. This system can be used with most a.c. machines including induction, synchronous, single phase induction motors as well as brushless d.c. and permanent magnet synchronous motors.

BRIEF DESCRIPTION OF THE DRAWINGS

In the accompanying drawings, which comprise a portion of this disclosure.

Figure 9:
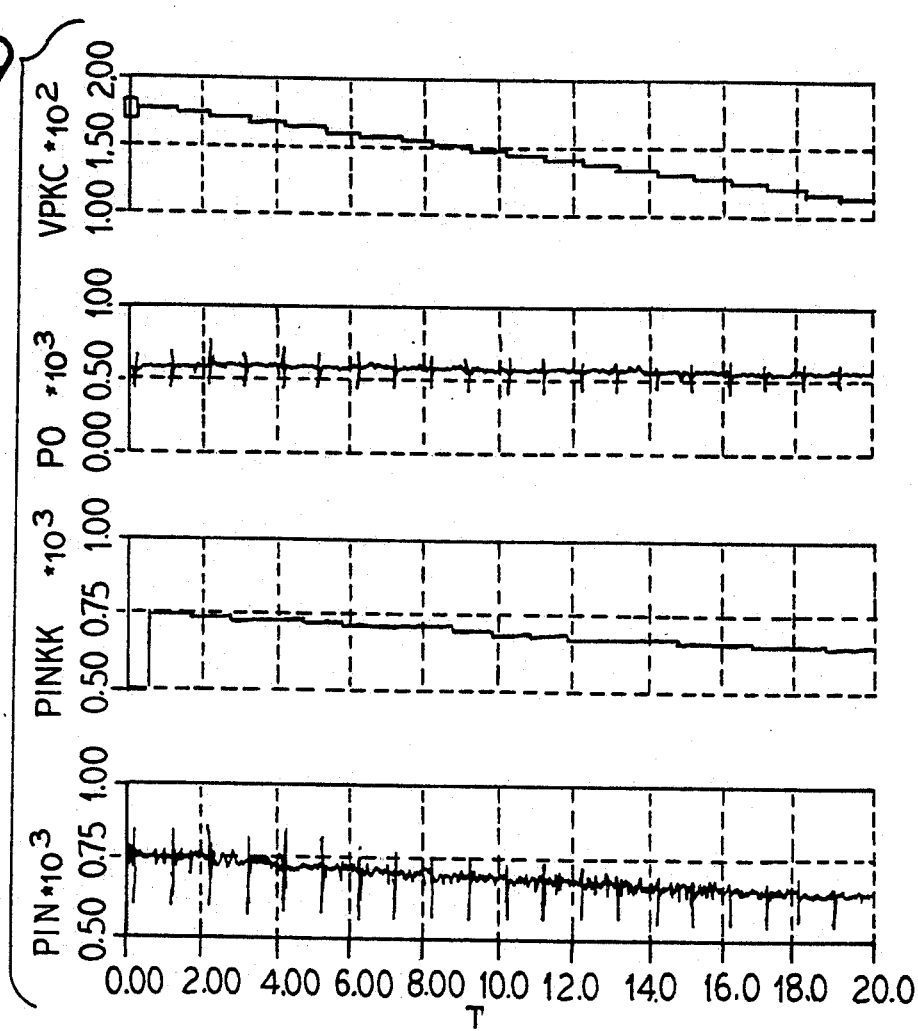
Figure 10:
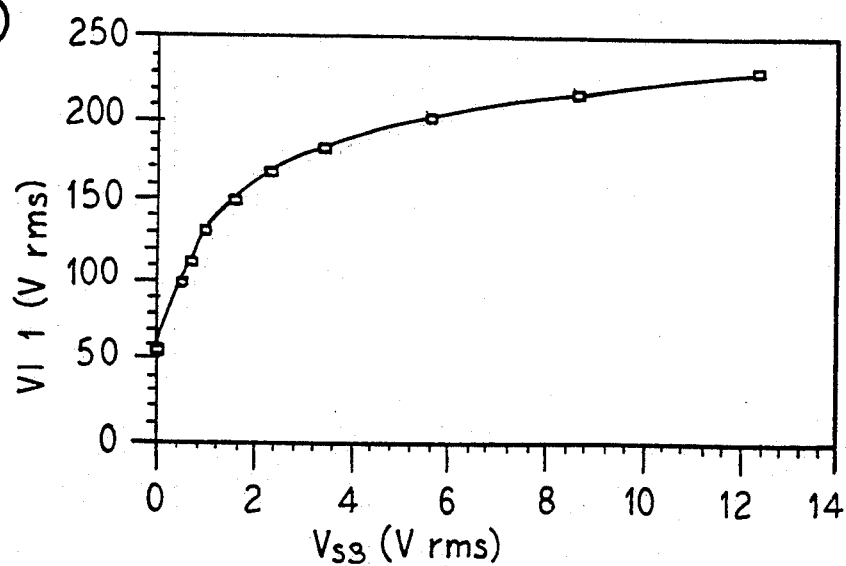
Figure 11:
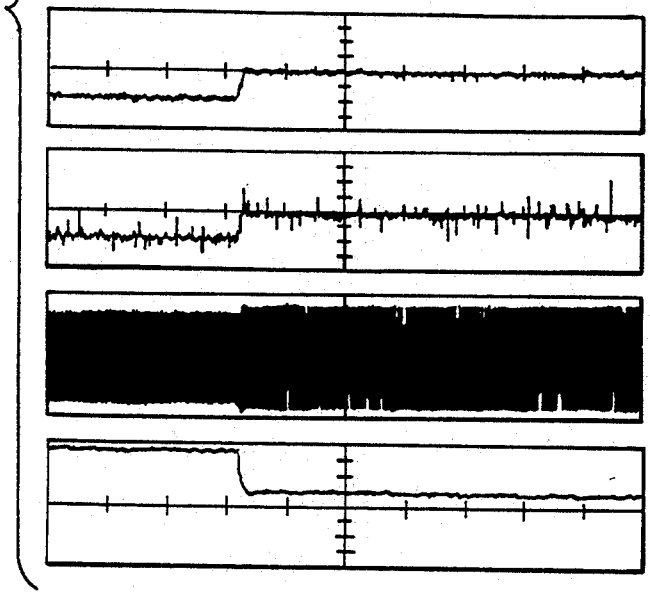
Figure 12:
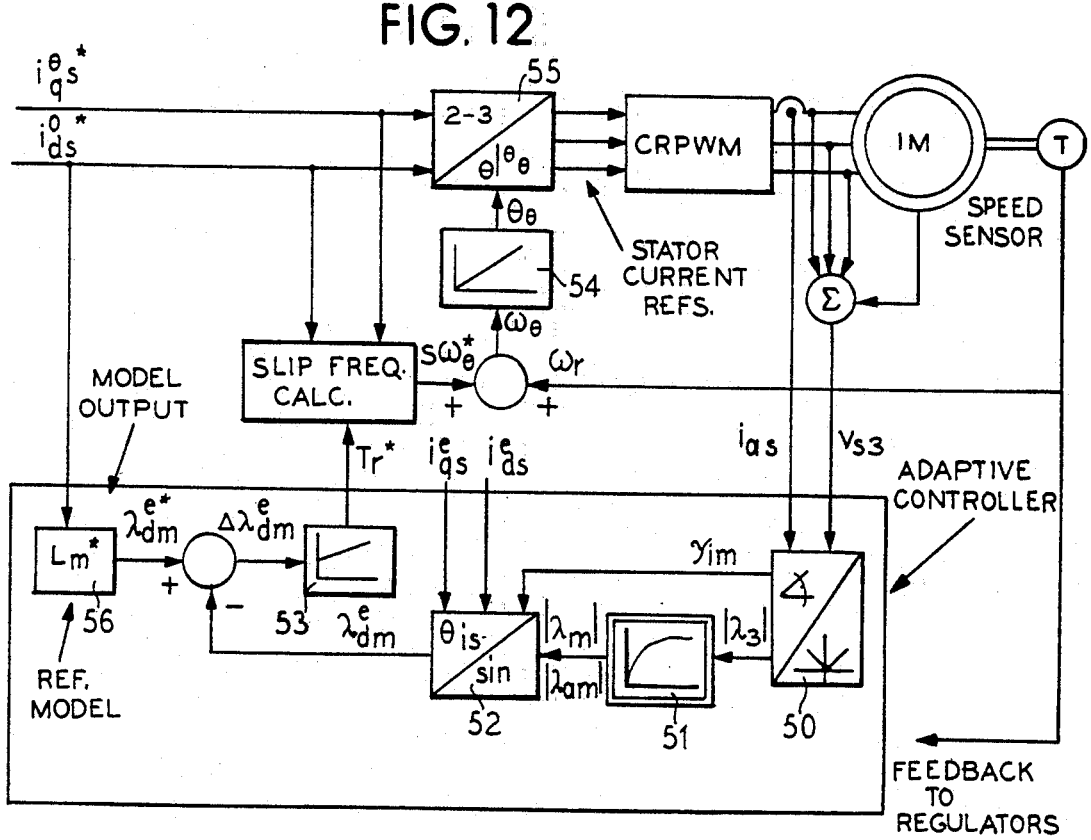
Figure 13:
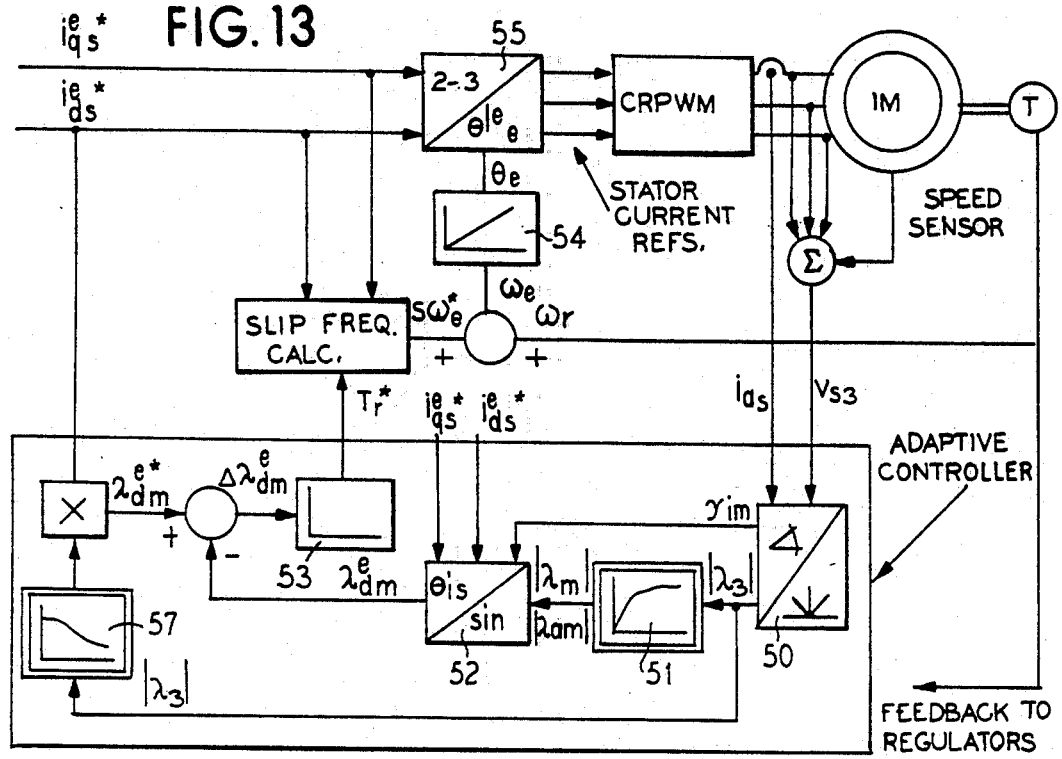
Figure 14:
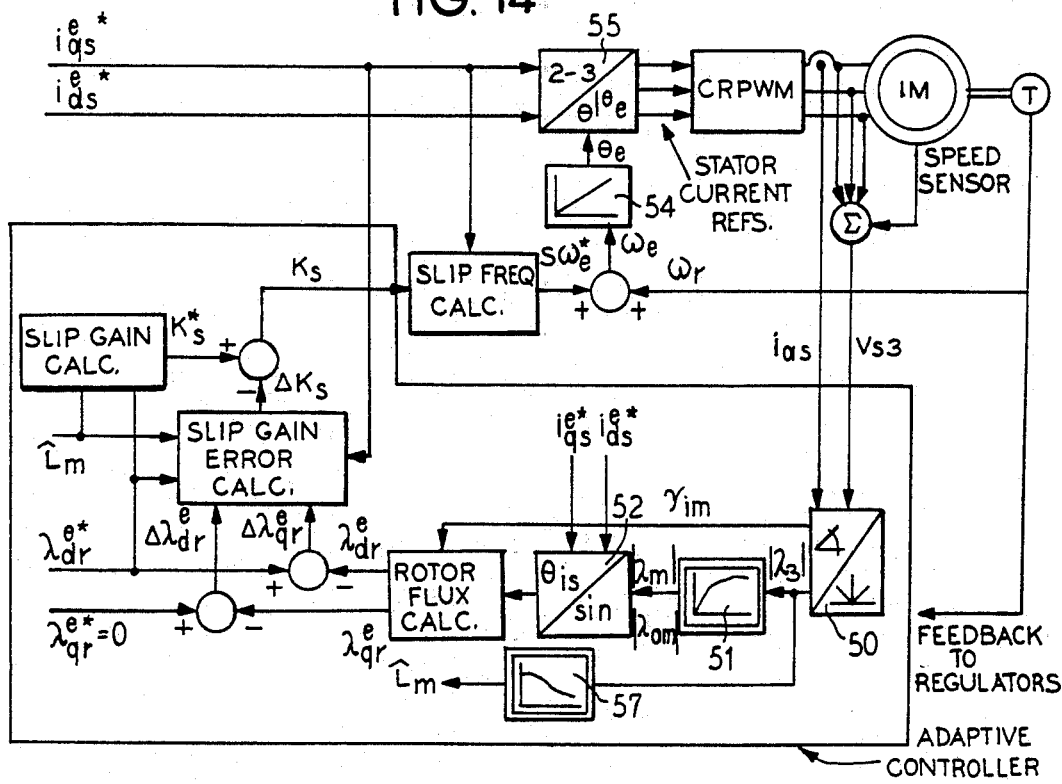
Figure 15:
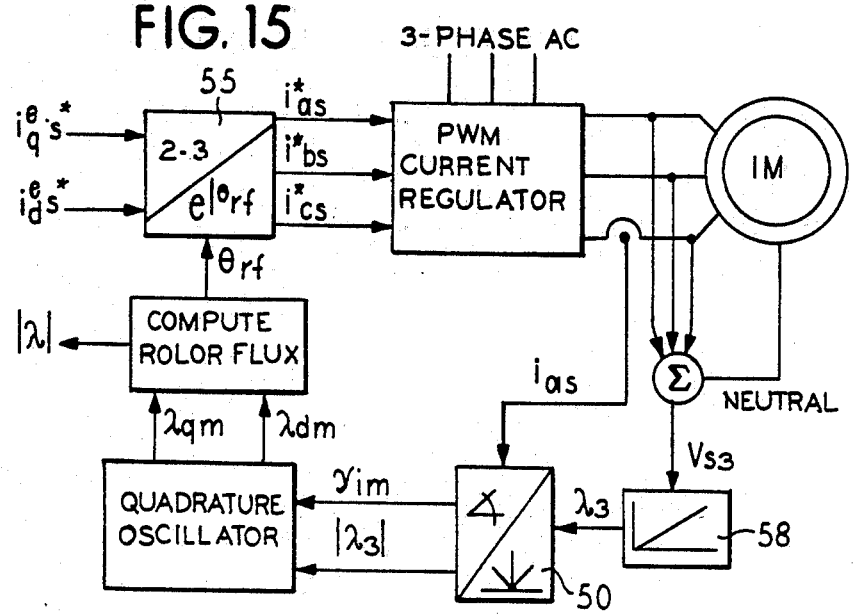
Figure 16:
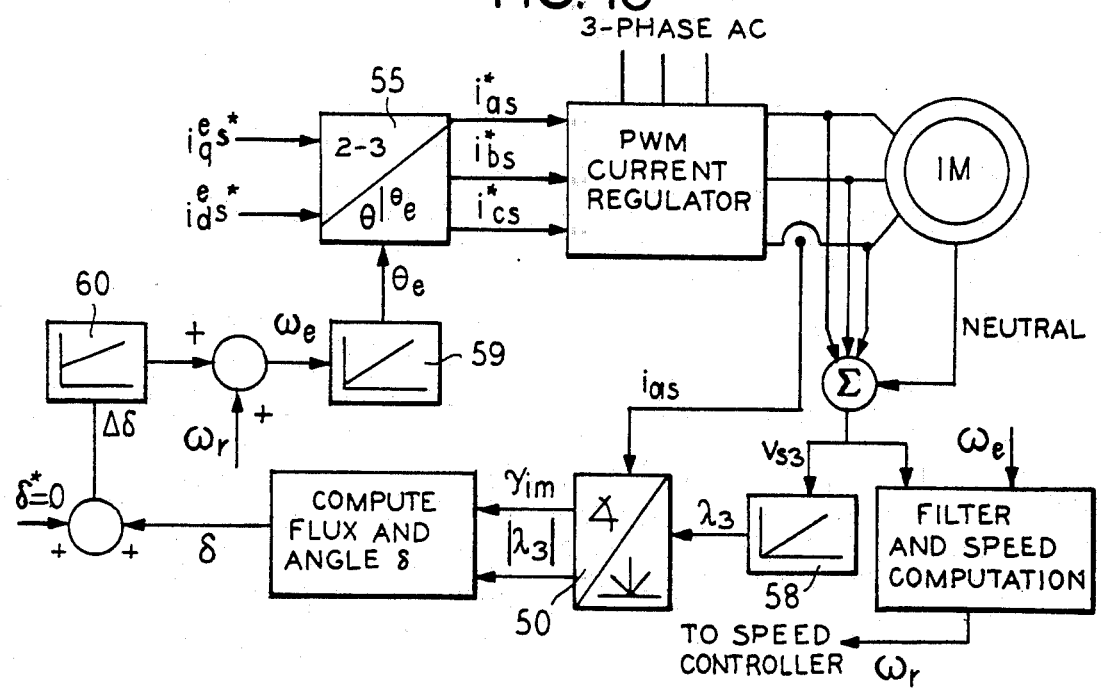

(a) the initial computations for input power and torque reference, (b) the main program and input power minimization, and (c) the interrupt service subroutine;

FIG. 9 shows simulation results for the indirect type of efficiency maximizer with Motor #1 driving a fan type of load. The traces shown from bottom to top are: (i) input power, (ii) input power samples at a rate of 500ms, (iii) mechanical output power, and (iv) amplitude of the stator phase voltage;

FIG. 10 shows experimental results for Motor #2 showing the dependence of the third harmonic voltage component on the fundamental value of the applied line voltage at rated frequency and no-load condition;

FIG. 11 shows experimental results for the efficiency controller using Motor #2. From bottom to top: (i) amplitude of the stator current (10 A/div), (ii) third harmonic voltage signal (2V/div), (iii) torque measured by the torquemeter (15 N.m/div), and (iv) torque computed by the controller (15 N.m/div);

FIG. 12 is a block diagrammatic view of another embodiment of a controller for a three phase induction machine utilizing a slip frequency calculator assuming invariant magnetizing inductance;

FIG. 13 shows in block diagrammatic view of an embodiment of model reference adaptive controller for implementation of a rotor time constant correction scheme with magnetizing inductance based on the amplitude of the third harmonic voltage signal; FIG. 14 shows a block diagrammatic view of a feedforward/-predictive feedback controller using the rotor time constant with the magnetizing inductance estimate based on the amplitude of the third harmonic voltage signal;

FIG. 15 shows a block diagrammatic view of a direct rotor field orientation controller using a scheme of locating the absolute position of the rotor flux from the third harmonic voltage signal; and FIG. 16 shows a block diagrammatic view of a direct rotor field orientation control implementation system driving the rotor flux angle $\delta$ to zero.

DETAILED DESCRIPTION

The present invention is applicable to all alternative current machines. However, for present disclosure purposes, three-phase induction motors are described. For a general discussion of the operation of motors and terms used in the art, see *Electric Machinery* by Fitzgerald et al. (5th ed.) McGraw-Hill, New York, which is incorporated herein by reference.

In an induction machine, for example, saturation of the magnetic field paths introduces spaced saturation harmonic components in the air gap flux due to the nonlinear nature of the flux saturation phenomenon. These saturation harmonic components travel in the air gap with the same synchronous speed and direction as the fundamental flux component. Among all these harmonic components, the third is the dominant one. When the three stator phase voltages are summed, the fundamental and characteristic harmonic voltage components are cancelled. The resultant waveform contains mainly the third harmonic component modulated by a high frequency component resulting from the air gap flux variations introduced by the rotor slots. The harmonic components of this signal can then be separated and used as a means to located the machine air gap flux, and, if desired, to measure the rotor mechanical speed.

Figure 1:
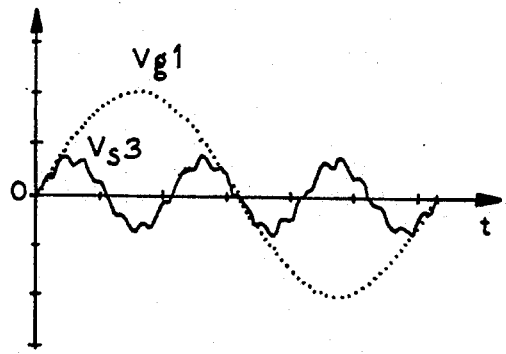
FIG. 1 is a graph showing waveforms of both the fundamental air gap flux voltage $V_{g1}$ and the third harmonic component $V_{g3}$ as modulated by the rotor slot harmonics obtained after the summation of the stator phase voltages.

FIG. 1 illustrates the characteristic relationship between the fundamental air gap voltage $V_{g1}$ and the third harmonic component of the air gap voltage $V_{s3}$ in a three phase alternating current machine obtained after summation of the stator phase voltages. Because no third harmonic currents can circulate in the stator (since the machine is assumed to be wye connected), the air gap third harmonic voltage $V_{g3}$ is identical to the third harmonic component of the air gap voltage $V_{s3}$. The third harmonic component is modulated by the rotor slot harmonics.

Figure 2:
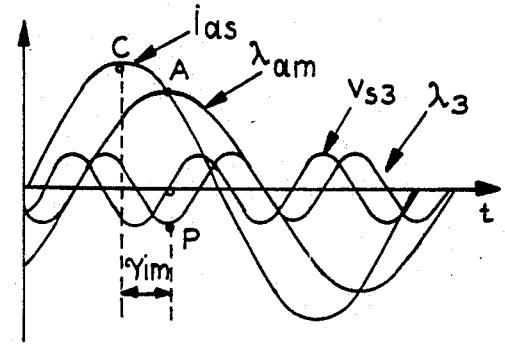
FIG. 2 is a graph showing fundamental components for the stator phase current $i_{as}$, air and the gap flux of one phase $\lambda_{am}$ and also showing the third harmonic component $V_{s3}$ and of the air gap voltage the angle of displacement $\gamma_{im}$ between the current and the third harmonic component $\lambda_3$ of the air gap flux.

After eliminating the high frequency component, which can be optionally utilized to measure the rotor mechanical speed, and after integration of the third harmonic voltage signal, the third harmonic air gap flux component is obtained as shown in FIG. 2.

The relative position of the fundamental component of the air gap flux in relation to the stator current is obtained by measuring the phase displacement angle between two fixed points in the third harmonic voltage and line current. For example, FIG. 2 shows the interrelation between the fundamental component of the representative stator current for one stator phase shown as $i_{as}$ and the fundamental component of the air gap flux ($\mu_{am}$) for the third harmonic component of the air gap voltage ($V_{s3}$). The third harmonic of the air gap flux $\lambda_3$ is obtained by integrating $V_{s3}$. The phase displacement for the stator current and the air gap flux is represented by the angle $\gamma_{im}$. The reference points, respectively, along the line current ($i_a$) and along the third harmonic voltage signal ($V_{s3}$) are appropriately taken so that $\gamma_{im}$ corresponds to the phase displacement angle between the maximum values of the stator current $i_{as}$ and the air gap flux fundamental component $\lambda_{am}$.

The position of point P in the third harmonic waveform is known in relation to the terminal current $i_{as}$; and the relative position of this fundamental component of the air gap flux is known with respect to this terminal variable (stator current). Thus, the position of the air gap flux in relation to the terminal current (or voltage) is known at all times if a given point on the third harmonic flux or voltage is located and tracked. The angle of displacement $\gamma_{im}$ between the air gap flux and the phase current of the stator is measured and can be used to compute, for example, the torque in a three phase induction machine, or for other purposes, as desired.

Figure 3:
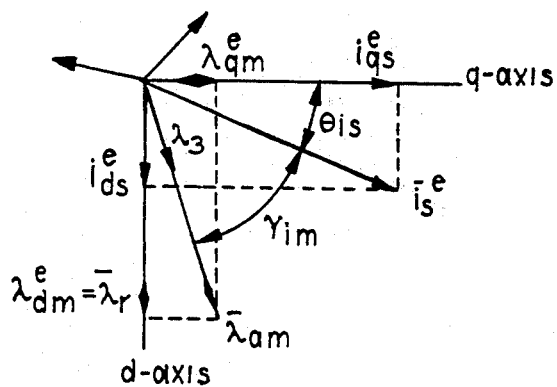
FIG. 3 is a plot showing the interrelationship between stator current air gap flux and third harmonic stator voltage vector ($v_3$) for one field orientation condition in the synchronous reference frame relative to the d-axis as ordinates and the q-axis as abscissae.

The air gap flux $\lambda_{am}$, the stator current $i_s^e$, and the air gap third harmonic flux $\lambda_3$ are vectorially interrelated as shown in FIG. 3 in the synchronously rotating reference frame representation for a condition of field orientation. It is clear from this vector arrangement that the fundamental of the air gap flux can be resolved into its d axis and q axis components $\lambda_{dm}^e$ and $\lambda_{qm}^3$ from a measurement of its magnitude and also the angles $\gamma_{im}$ and $\theta_{is}$.

The d-axis component of the air gap flux, which corresponds to the rotor flux when the machine is field oriented, is then computed as:

$$\lambda_{dm}^e = -|\lambda_{am}^e|\sin(\theta_{is} + \gamma_{im}) = -f_\lambda(|\lambda_3^e|)\sin(\theta_{is} + \gamma_{im}) \quad (1)$$

with $\theta_{is}$ being computed from the prechosen reference values for the stator currents, $i_{qs}^{e*}$ and $i_{ds}^{e*}$ indicated by:

$$\theta = -\tan^{-1}\frac{i_{ds}^{e*}}{i_{qs}^{e*}} \quad (2)$$

The amplitude of the fundamental of the air gap magnetic flux component, $|\lambda_{am}|$ is obtained from the third harmonic air gap component amplitude, via a non-linear function, $f_\lambda$:

$$|\lambda_{am}| = f_\lambda(|\lambda_3|) \quad (3)$$

Values for this function are unique to a given machine and these values can be experimentally determined for an unloaded machine, or the like.

Figure 4:
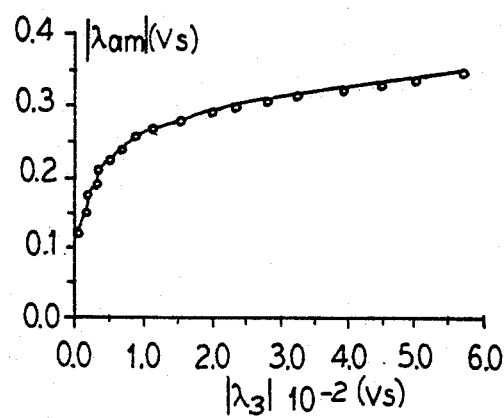
FIG. 4 is a graph showing the relationship between the air gap flux component (plotted as ordinates) and the amplitude of the stator third harmonic voltage (plotted as abscissae in volts) for a 3-hp induction machine.

FIG. 4 shows the experimentally determined relationship for an exemplary three phase inductive motor between the amplitude of the fundamental component of the air gap flux and the amplitude of the third harmonic component of the stator phase voltage (or the amplitude of the third harmonic component of the air gap flux). The third harmonic voltage is plotted as abscissae and the fundamental component of the air gap flux is plotted as ordinates for a 3-hp machine. The values represent the amplitude of the third harmonic voltage after the summation of the three stator phase voltages.

As can be appreciated from the foregoing description, the present invention provides a method for measuring the air gap flux existing in an operating alternating current machine. This measurement provides the absolute flux magnitude in the air gap at any given time and the relative position of such flux.

In particular, the method for indirectly determining air gap flux in an alternating current machine having a stator, a rotor, and an air gap therebetween comprises the following steps:
a) measuring the third harmonic component of the stator voltage; and
b) calculating the third harmonic component of the air gap flux by integrating the measured third harmonic stator voltage component.

Moreover, the maximum magnitude of the third harmonic component of the air gap magnetic flux can be calculated from the third harmonic component of the air gap flux. From the maximum amplitude of the third harmonic component of the air gap magnetic flux, the maximum magnitude of the fundamental component of the air gap flux is calculated by interpolating the maximum magnitude of the third harmonic component of air gap flux relative to previously measured empirical data characteristic of the machine. From this calculation, values for the function $$\lambda_{am} = f(v_{s3}) \quad (4)$$

are obtained where $\lambda_{am}$ is the fundamental component of the air gap flux for a distance of $2\pi$ radians which corresponds to 360° of rotation of said rotor, and $V_{s3}$ is the third harmonic component of the stator voltage for the distance of $2\pi$ radians which corresponds to 360° of rotation of the rotor.

The previously measured empirical data is obtained by preliminarily establishing for the machine the quantitative relationship between the maximum amplitude of the third harmonic component of the stator voltage at rated line voltage for the machine and with the machine operating under no mechanical load. The rotation speed of the rotor can be computed from higher harmonic components associated with the third harmonic component of the stator voltage.

In a preferred embodiment, the machine is a multiphase induction machine and the third harmonic component of the stator voltage is measured by summing the voltages of each respective phase. More preferably, the machine is a three phase induction motor.

According to the method, a representative stator current can be measured concurrently with the measuring of the third harmonic component of the stator voltage; and the stator current can then be compared with the calculated third harmonic component of the air gap magnetic flux to determine the phase angle therebetween.

In addition, the torque of the machine can be computed from the equation:

$$T = \frac{3P}{4} |i_{as}||\lambda_{am}|\sin\gamma_{im} \quad (5)$$

where:

$|i_{as}|$ is the amplitude of the representative stator current, $|\lambda_{am}|$ is the amplitude of the fundamental component of the air gap magnetic flux, $\gamma_{im}$ is the phase angle between the stator current and the third harmonic component of the air gap magnetic flux, P is the number of poles, and T is the torque.

The output power of the machine can also be computed from the equation $$P_o = T \omega \quad (6)$$

where:

$P_o$ is the output power

T is the torque, $\omega$ is the rotation speed of the rotor, and wherein $\omega$ is computed from harmonic components higher than the third harmonic component which are associated with the stator voltage.

Tests were conducted using a 3-hp, 230 V, 4 pole induction motor, and a 7.5-hp, 220 V, 4 pole induction motor (referred to, respectively, as Motor #1 and Motor #2) in evaluation work relating to the present invention. With the exception of the tests done to evaluate the operation of a machine at different frequencies, all the evaluation tests were performed with the indicated test machine powered by a sinusoidal voltage supply.

A spectrum analysis of the frequency contents for the air gap flux was performed to see whether or not the third harmonic component of the air gap magnetic flux was the dominating saturation harmonic. The third harmonic was found to be the dominant harmonic component, so that the model is able to predict the saturation effects with good accuracy. The presence of all odd harmonic components was found in the air gap flux, including the triplens. The ratio between the third and fifth harmonic amplitudes was about 3.75, and between the third and the seventh harmonics the ratio was about 7.5. These ratios are much larger than they would be for the case of a square wave, showing that the resultant air gap flux is far from a square waveform. These higher harmonics could be incorporated if a better correlation is desirable, but given the accuracy of the results, the higher harmonics are not really needed.

Testing also has shown that the loading of the machine does not introduce any noticeable phase shift in the third harmonic flux. The resultant air gap flux kept its basic flattened top characteristic for all load conditions.

The variation of the third harmonic voltage signal with the motor speed for a constant air gap flux level was evaluated. The variation of the third harmonic voltage signal was a linear function of the speed as expected from the model, since the motor operated under a no-load condition. Even for an air gap flux reduced to half of its rated value, the third harmonic voltage signal had considerable amplitude. This indicates that this signal can be utilized to estimate the air gap flux of the machine even at reduced flux levels.

The air gap magnetic flux information can be used to calculate the output power of the motor. The output power calculation can be based on rotor speed and torque. Only a single sensor wire attached to the neutral point of the machine need be employed to cause the respective phase voltages to be accessible.

Input power is separately calculated from the electrical energy being fed, for example, from a rectifier to a voltage source inverter being used to supply power to the induction motor.

The calculated output power and input power are both fed into a microprocessor, or the like, which is programmed with an efficiency maximization algorithm that utilizes both such power inputs and produces an output signal that is fed to a voltage and frequency controller. Outputs from the controller are fed to a voltage source inverter and thereby used to regulate the input power. The air gap flux is thus readily adjusted to produce a minimum input power for a fixed amount of output power (fixed speed motor operation).

Although a three-phase induction motor is described herein for illustrative purposes, the efficiency maximization technique of this invention can be extended to other types of alternating current machines, as those skilled in the art will readily appreciate.

In the case of electrical machine static drive systems which inherently involve varying load demands, improvement in operating efficiency is possible at an inherently relatively low price since the controller used to develop the optimum flux condition is derived from the same converter used to vary the speed of the drive. In these applications, the cost of an inverter is already justified on the basis of its energy saving impact on the load; for example, eliminating vanes to control the flow of air in a compressor, or the like.

Given an induction motor drive delivering a particular mechanical output power, many different combination pairs of stator voltage and synchronous frequency are possible once the mechanical output power is satisfied. The efficiency for each one of the various motor operating conditions is different. For instance, when the applied voltage is high and the frequency is low, the machine saturates and excessive iron losses occur. When the voltage is low and the frequency is high, the iron losses are reduced because the machine is not saturated as much, but the slip is high, which contributes to an increase in the rotor and stator copper losses.

A loss model for an induction motor such as described above can be used in order to evaluate the induction motor efficiency at different values of voltage and frequency while maintaining a constant level of output power. For example, when efficiency contours for Motor #1 for an output power level of 0.25pu were plotted, it was found that maximum efficiency (about 81 percent) was reached for a stator phase voltage value of 110 Vrm and a frequency value of about 38 Hz, corresponding to a ratio of volts/frequency (V/f) of 2.89. For a voltage value of 127 Vrms and a frequency of 60 Hz, which corresponds to the rated value of V/f=2.12, the efficiency of the motor was lower than 72 percent. Thus, an improvement of about 10 percent in the motor efficiency is achieved when the machine is operated with V/f=2.89 instead of with the rated V/f for this load condition.

As another example, efficiency contours for Motor #2 were plotted for a load condition of 0.25pu. It was found that a maximum efficiency value of about 91.3 percent was achieved for a V/f of 2.22 while a value of about 81 percent is encountered for the rated V/f of 2.12. An improvement in efficiency of about 10 percent is thus achieved in this condition.

Maximum voltage and maximum torque limits are thus indicated. The maximum voltage limit for the motor operation is fixed at 20 percent above the rated voltage value, and it is reached for high values of V/f. On the other hand, when this ratio is small, the pull out torque can be reached, and further reduction in this ratio would not be possible if the specified output power were to be maintained. At any rate, the maximum efficiency is always achieved for the V/f ratio between these two limit values. These limits, however, have to be monitored in order to avoid operational problems.

The efficiency contours for Motor #1 for the same output power level of 0.25 pu (as above described with three different values for the load torque, $T_1=0.25$ pu, $T_1=0.36$ pu and $T_1=0.43$ pu) were studied. It was found that the solution pair voltage/frequency has to satisfy the torque constraint, causing the efficiency to become a function of the torque that the motor has to supply at the output power level. Thus, a maximum efficiency of 81.2 percent for a $P_m$ of 0.25 pu is possible only if the torque supplied by the motor is in the neighborhood of 0.36 pu. As the load torque is reduced to 0.25 pu, for instance, the maximum efficiency attainable drops to approximately 77 percent.

For such variation of efficiency with the torque level at a given constant output power, it is found that there exists an optimal value for the load torque for which a maximum global efficiency is achieved; higher or lower torque values result in lower values for the efficiency. Specifically, in the case of Motor #1, this torque value corresponds to 0.36 pu. At this value of torque, and at 0.25 pu of output power, the balance between the iron and copper losses favors a maximum efficiency. Lower values of torque imply higher speeds when the iron loss becomes dominant. Consequently, a reduction of air gap flux is necessary in order to improve the efficiency of the drive. On the other hand, as torque increases and speed decreases, the copper losses become dominant, implying that a better efficiency is achieved with increased flux level and lower slip.

The frequency of the rotor slot pulsations, is conveniently detected by an analog circuitry employing a conventional variable band-pass-filter. The rotor mechanical speed is then readily computed from that signal using, for example, a technique similar to that described by Zinger in "Induction Motor Speed Control Using Tapped Stator Windings" Ph.D. Dissertation, University of Wisconsin, Madison, 1988.

Figure 5:
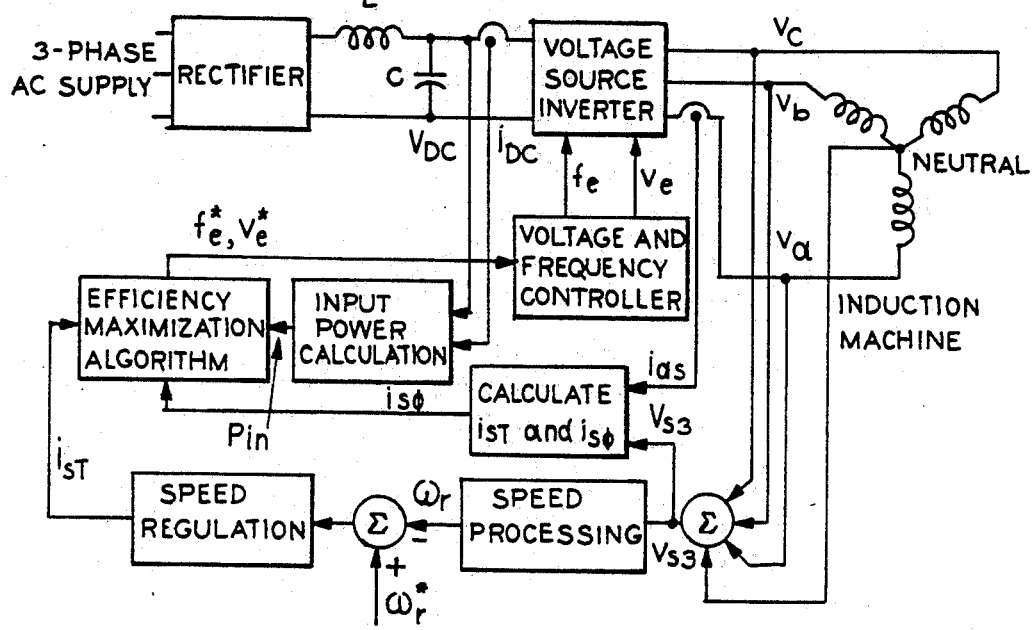
FIG. 5 is a block diagrammatic view of one embodiment of an efficiency controller for a three phase induction motor using the indirect method and constant speed.
Figure 6:
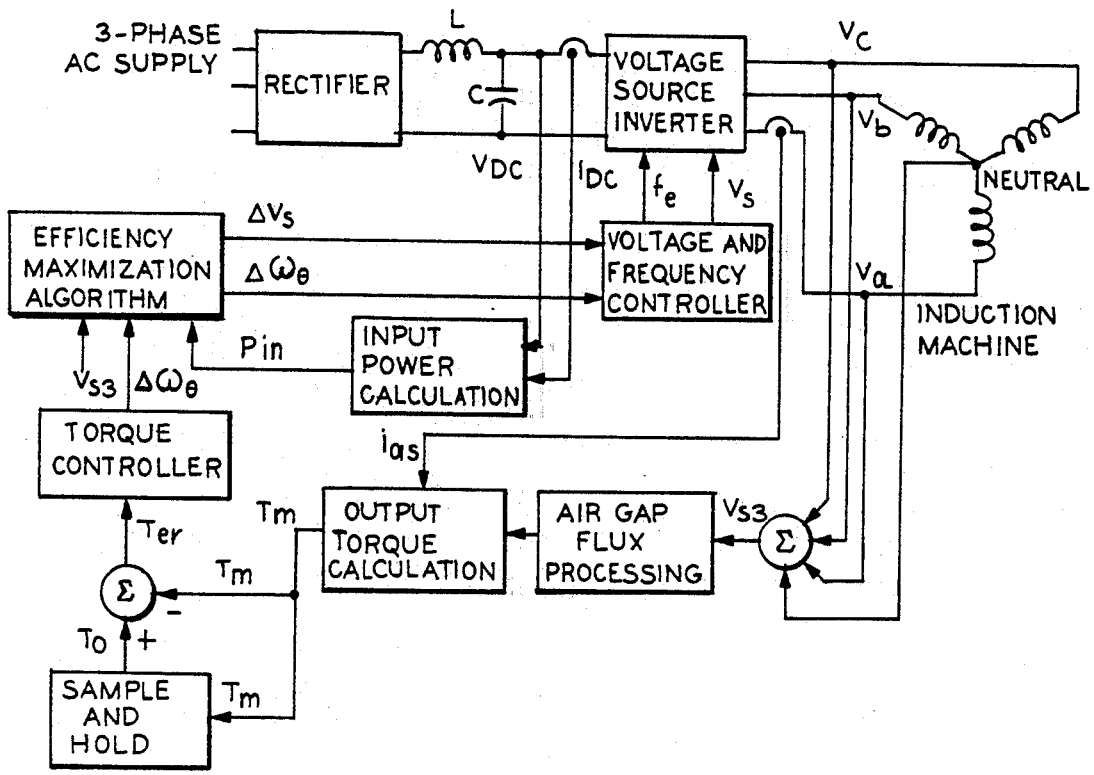
FIG. 6 is a block diagrammatic view of another embodiment of an efficiency controller for a three phase induction machine also using the indirect method but instead using constant torque or power.

Two embodiments of efficiency controllers are shown in FIGS. 5 and 6. In. FIG. 5, the amplitude of the third harmonic stator voltage component is not used. However, the phase of the stator voltage signal is employed to resolve the stator current into its respective flux producing and the torque producing components. The voltage and frequency of the inverter are then adjusted to reach a minimum input power by adjusting the flux producing component of motor current while keeping the speed constant.

Implementation of this constant speed efficiency controller is shown in FIG. 5. In general, the efficiency controller operates in the background with a minimization algorithm updating the voltage and frequency commands perhaps only several times per second to drive the operating point to a minimum input power while keeping the output power constant. Hence, the overall dynamic response of the drive remains essentially unaffected. The optimum controller should be disabled when a new speed command is issued or when the load demand changes. However, such problems are resolvable by prior art teachings; see, for example, D. S. Kirschen, "Optimal Efficiency Control of Induction Machines", Ph.D. Dissertation, University of Wisconsin, Madison, 1985. If the torque is reasonably constant with speed, or varies only slightly, a maximum efficiency condition can still be maintained even while the torque is changing.

The second efficiency controller embodiment shown in FIG. 6 is applicable in cases where the torque speed curve is essentially fixed, such as fans, pumps, and the like. In such cases, the speed measurement can be dispensed with since regulation at constant torque implies that output power is also maintained constant. An implementation for this constant torque and/or constant power efficiency controller is shown in FIG. 6.

While these illustrative embodiments each employ a series connected rectifier and inverter between the power supply and the induction motor, it will be appreciated by those skilled in the art that the inventive controller does not require the use of such particular components, and that other components performing equivalent functions can be used.

In such efficiency controllers, the torque is computed from the stator current and air gap flux as shown by:

$$T_e = \frac{3P}{4} |i_{as}||\lambda_{am}|\sin\gamma_{im} \qquad (7)$$

where the angle $\gamma_{im}$ is defined as shown in FIG. 2. The amplitude of the air gap flux $|\lambda_{am}|$ is obtained from the third harmonic flux component amplitude via a non-linear function defined as $f_\lambda$:

$$|\lambda_{am}| = f_\lambda(|\lambda_3|) \qquad (8)$$

This function relating the amplitudes of the fundamental and third harmonic components of the air gap magnetic flux is associated with the saturation level of the machine. Values for this function are obtainable experimentally using the conventional no-load test.

The third harmonic component of air gap flux $\lambda_3$, in turn, is obtained from an integration of the third harmonic stator voltage signal, $V_{s3}$:

$$\lambda_3 (+) = V_{gg}(t)dt \tag{9}$$

Alternatively, torque $T_e$ can be computed from:

$$T_e = \frac{3P}{4} \frac{|i_{as}||v_g|}{w_e} \cos\gamma_{im} \tag{10}$$

where $|v_g|$ is the amplitude for the fundamental component of the motor air gap voltage, which can be obtained directly from the amplitude of the third harmonic signal stator signal voltage $V_{s3}$ via another non-linear function:

$$|v_g| = f_v(|V_{s3}|) \tag{11}$$

While this alternative way of computing the motor torque does not need any integration as in the method described above, it does require a knowledge of the synchronous frequency $w_e$.

Most of the loads driven by adjustable frequency induction motor drives are of the type wherein the torque is a function of the speed to a positive power:

$$T_e = w_r^k \tag{12}$$

with the exponent k being positive and normally higher than 1. Therefore, the implementation of the efficiency maximization controller presented in FIG. 6 is preferred, for its simplicity, rather than the scheme proposed in FIG. 5.

In FIG. 5, a simple analog adder circuit is used to obtain the third harmonic stator signal $V_{s3}$, which, after being filtered by LPF (low pass filter), is free of high frequency contents due to the inverter switching frequency and rotor slot ripple. The line current $i_{as}$ is also filtered by a low pass filter (LPF) to compensate for the phase shift introduced into the signal $V_{s3}$ by the filter. Signal $V_{s3}$ is then one of the input signals to a digital controller, which can be a Motorola DSP 56001, or the like, where it is sampled and integrated in order to generate the third harmonic component of the air gap flux signal $\lambda_3$. The amplitude for the air gap third harmonic flux $|\lambda_3|$ is then computed, and the amplitude of the fundamental air gap flux is next obtained by means of a reference table which includes function $f_\lambda$, as described in Eq. 8.

Angle $\gamma_{im}$ is thus determined. $V_{s3}$ is the only signal available for flux sensing. Normally, when air gap flux sensing is employed, two sensors are positioned in the air gap in a quadrature arrangement such that sine and cosine functions are generated. This arrangement allows the instantaneous estimation of the air gap flux position with respect to the stator mmf. Here, since one has a single signal (sine or cosine) for use, the position of the air gap flux with respect to the stator current has to be determined indirectly.

Since no third harmonic component for the current signal exists, the current signal is applied to a non-linear network to generate a third harmonic output signal. A comparator, configured, for example, as a zero crossing detector, or the like, is chosen for use as such a network. The output signal is a square wave of fixed and known amplitude. The fact that the amplitude of the square wave is known is important when normalizing the resultant signal which is used to compute the angle $\gamma_{im}$. The resultant squared current signal can be written as:

$$\hat{i}_{as} = \frac{4}{\pi} \hat{I}_s \left[ \sin\theta_e + \frac{1}{3}\sin3\theta_e + \frac{1}{5}\sin5\theta_e + \ldots \right] \tag{13}$$

In the same way, the third harmonic voltage signal is also applied to a zero crossing detector, and the resultant square wave is represented by:

$$\hat{v}_3 = \frac{4}{\pi} \hat{F}_3 \left[ \sin3(\theta_e - \gamma_{im}) + \frac{1}{3}\sin9(\theta_e - \gamma_{im}) + \right.$$

$$\left. \frac{1}{5}\sin15(\theta_e - \gamma_{im}) + \ldots \right] \tag{14}$$

By multiplying these two square waves, a signal is produced containing direct current and oscillatory terms. Filtering this product signal with an LPF, a resultant signal is produced containing only a direct current component which is a function of the angle $\gamma_{im}$, as shown in Eq. 15:

$$M_\gamma = \tag{15}$$

$$\frac{16}{\pi^2} \hat{F}_3 \hat{I}_s \frac{1}{6} \left[ \cos3\gamma_{im} + \frac{1}{9}\cos9\gamma_{im} + \frac{1}{25}\cos15\gamma_{im} + \ldots \right]$$

Angle $\gamma_{im}$ can be obtained from the signal $M_\gamma$. A reference table can be implemented in the digital controller. The input signal to this table is the normalized signal:

$$M_\gamma / \frac{16}{\pi^2} \hat{F}_3 \hat{I}_s \frac{1}{6}, \tag{16}$$

which varies from $-1$ to $+1$. Here, the desirability of knowing the amplitudes $\hat{F}_3$ and $\hat{I}_s$ is appreciated. The squaring of the current and third harmonic flux, and the multiplication of the two square waves, are each performed with associated software. The option for the software solution is possible due to the high speed of the commercially available digital signal processors. In order to have a good resolution for the squaring of the third harmonic flux, a sampling period of 50 $\mu$s is used; however, longer and shorter time intervals can be used.

Figure 7:
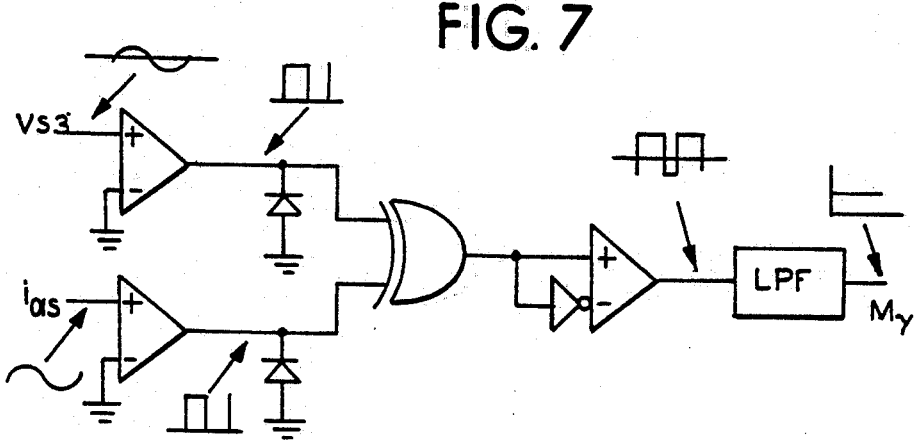
FIG. 7 is a block design of hardware circuitry which can be used to determine the phase displacement.

Alternatively, if desired, a hardware solution can be employed, for example, if the controller is to be implemented with a slower processor. In this case, it is advantageous to perform the squaring and the multiplication of the two signals using a conventional hardware circuit, or the like. A simple hardware solution is presented in FIG. 7. Since each of these two signals to be multiplied are square waves, a simple solution for the multiplier circuit is possible, making the need for a true multiplier unnecessary.

After computing the angle between the fundamental components of the air gap flux and stator current, the output torque is computed as in Eq. 7. The torque thus computed is then used as a feedback variable for a torque regulator. The reference value for the torque, $T_o$ in FIG. 6, is the value that is obtained from a sample and hold block. The input to the sample and hold block is the same value of the torque computed using Eq. 7.

A brief description of the operation of the controller of FIG. 6 follows. The input power to the inverter is measured and its statistical variation ($S_{Pin}$) computed. When this variation is close to zero, or to a low defined value, it implies that the output power is constant and that the drive has reached a steady state condition. Only then does the efficiency algorithm such as the algorithm of FIG. 8 act by enabling a timer interrupt that is programmed to be internally generated by the microprocessor every 50 μs or more or less as desired. Before enabling the interrupt, the torque at the steady state condition is estimated and defined as the reference value ($T_o$) for the torque regulator. This torque reference value is kept constant throughout the optimization process, or until an external change in the operating conditions, coming from an operator or any automatic control, is required. When such change in command occurs, or when the optimization process is over, the timer interrupt is disabled. The program is directed to compute the input power variation only when an external command change occurs in the command. When the optimization process is over, the timer interrupt is disabled, and the controller then keeps waiting for any change coming externally.

After the system reaches a steady state condition, the efficiency algorithm takes over by decrementing the voltage command to the inverter by $\Delta V_s$. The output torque then decreases, and the torque error increases, which makes the torque regulator generate a change in the synchronous frequency in order to adjust the torque back to its original value prior to the voltage change. After the torque is regulated, the efficiency algorithm compares the new input power level with the value before the voltage and frequency changes, and decides if further changes in these variables are necessary in order to achieve a minimum input power.

Figure 8A:
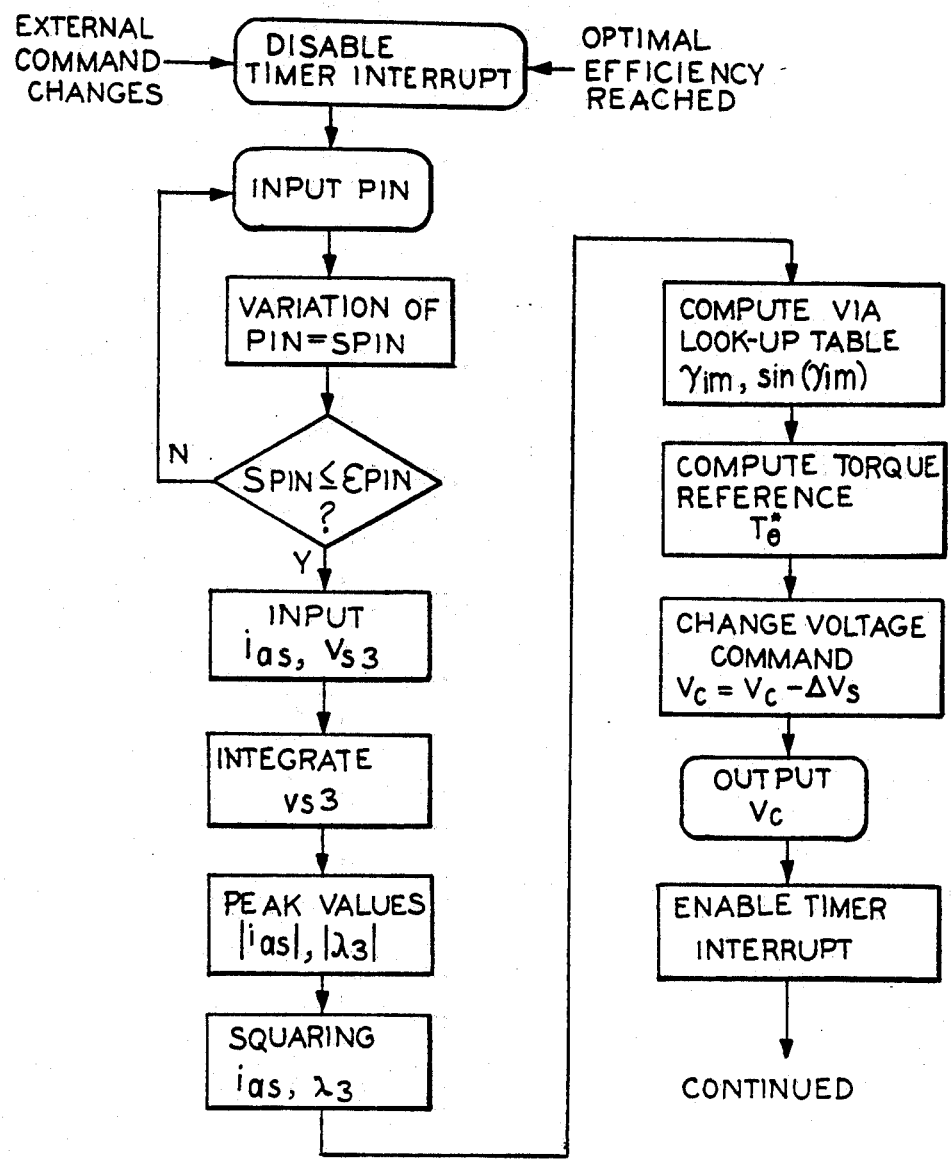
FIGS. 8(a)–8(c) are flow charts for the efficiency maximum control algorithm including.
Figure 8C:
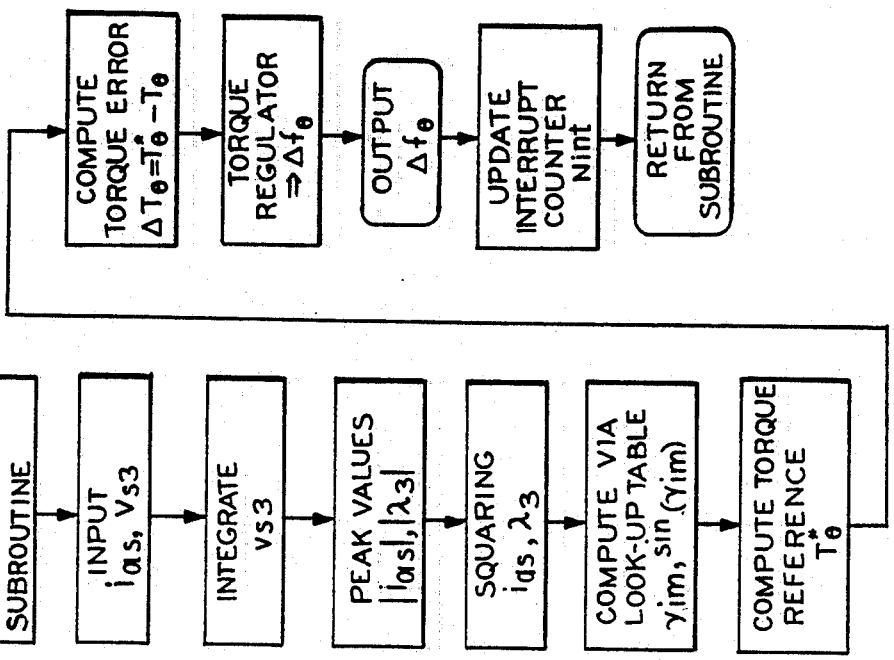
Figure 8B:
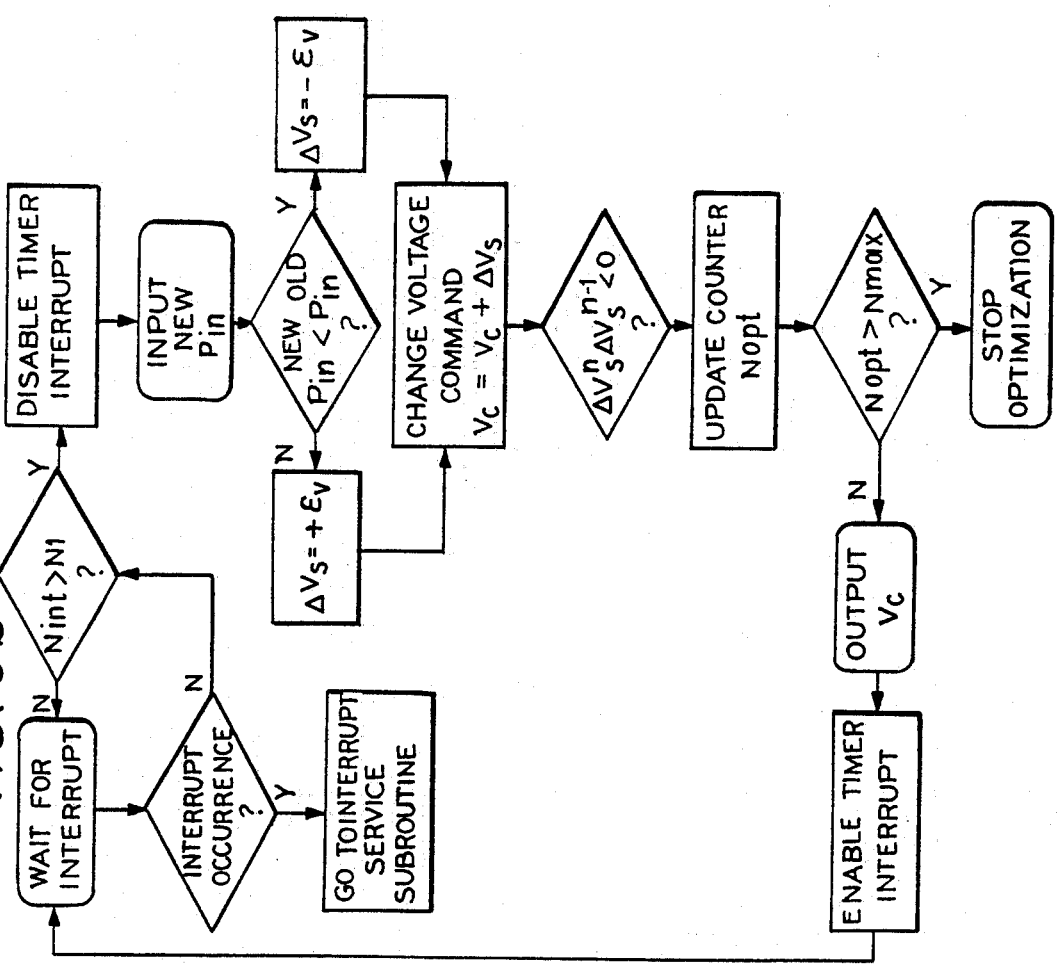

FIG. 8 presents a flow chart for a digital implementation of one suitable controller. The torque regulator is activated every time that an interrupt occurs (such as, for example, 50 μs, or more or less), while the optimization of the input power and the changes of voltage occur at a much lower rate, such as, for example, 400ms, or more or less, which values were employed in the case of a test and evaluation implementation.

The whole input power minimization process can take several seconds. Enough time is given to the torque regulator to adjust the torque of the machine according to the reference value.

A digital simulation model for the proposed efficiency controller was developed and utilized as a tool to aid in the design and evaluation of the software and hardware implementation of the system. The simulation program assumes a third harmonic air gap flux component which amplitude is governed by the saturation function $f_\lambda$ as in Eq. 8. A complete model for the system, such as the one developed for a controller as described hereinabove is not applicable in this case. The solution for the complete model requires a very small integration step size in order to accommodate the variations of the saturation factor. On the other hand, a complete loss model for the induction machine (such as the one described hereinabove) is, however, suitable for use in this exemplary embodiment and in this simulation program.

FIG. 9 shows some illustrative simulation results obtained from the efficiency controller used with Motor #1. The traces shown from bottom or top are: (1) alternating current active input power to the converter, (ii) input power sampled at a rate of approximately 1 Hz, (iii) output mechanical power, and (iv) amplitude of the stator phase voltage. The output power corresponds to approximately 0.25 pu with the motor running at rated speed. As the applied voltage was reduced by the controller, the torque regulator kept the torque at a constant level. As a result, since the load driven by the motor has a quadratic torque speed characteristic (fan type), the output power was kept constant. From this simulation case, a gain of approximately 120 Watts was achieved which implies a gain of about 15 percent in efficiency.

A situation where the actual torque, and the torque computed via the third harmonic flux, and the fundamental current signals for a positive step change in the applied voltage of about 0.35 $V_s$ was studied. The output signal of the torque regulator, was added to the frequency command sent to the inverter. In this case, the motor was started from rest with rated voltage, frequency, and rated load. The voltage change occurred after the efficiency controller detected no change in the input power when the starting transient had ended. The increase in voltage did not produce a change in the output torque because the torque regulator decreased the synchronous frequency applied to the inverter. The necessary correction for the frequency was small because the torque did not vary much from its value prior to the voltage disturbance. For this simulation case, the torque estimation was performed at a rate of 10ms, and, because of that, it followed the actual torque with some delay. It was noticed that the torque response was much better for the experimental implementation where the torque is computed at a rate of 50 μs.

In another simulation, the actual torque, speed, input power and variation of the stator voltage were plotted. Relatively large power and torque oscillations were found to occur at every change in the stator voltage. However, the steady state torque was kept constant while the input power decreased to a value that was approximately 75 Watts lower than the initial power level. The conditions in which these traces were obtained are the same as those used in acquiring the data in the referenced FIG. 9.

The third harmonic voltage waveform and one of the phase currents for Motor #2, were obtained for a rated load condition and sinusoidal voltage supply. A Spectrum Analyzer was utilized to measure the harmonic contents of the third harmonic. The third harmonic was clearly the dominant component followed by the rotor slot harmonic. The amplitude of the third harmonic signal was a function of the saturation level of the machine, and, consequently, was a function of the excitation voltage.

These same quantities were obtained for Motor #2 at a no-load condition and fed by the PWM inverter described below. The third harmonic voltage contained the high frequency components due to the inverter switching frequency and the rotor slot harmonic. The rotor slot harmonic had a significant amplitude when compared to the rest of the harmonics in the spectrum, allowing the speed detection to be implemented, if desired, or needed. As the motor load increased and the terminal voltage was kept constant, the third harmonic voltage amplitude dropped due to a reduction in air gap flux while the rotor slot harmonic amplitude increased, mainly because of the increase in the rotor mmf harmonic components. The high frequency noise still present in the third harmonic signal was further reduced without any difficulty by filtering the signal. The spectrum for the third harmonic signal showed a low frequency content which was due to a slight imbalance in the inverter output voltage. Such conditions, however, do not pose any problem in the processing of the third harmonic signal which is by far the dominant component.

Experimental results were obtained and plotted as shown in FIG. 10 showing the variation of the sensed third harmonic rms voltage, V3, with the fundamental rms line voltage, $V_{11}$, for Motor #2 operating without load with sinusoidal excitation at fundamental frequency. It was found that a very useful signal for the third harmonic voltage existed even for terminal voltages approaching 30 percent of the rated value.

As the machine mechanical load increased, the angle $\gamma_{im}$ between fixed points in the third harmonic voltage waveform and the line current increased as mentioned previously. Motor #2 was loaded from zero to rated load while keeping the stator voltage at rated value.

The motor output power was computed from the third harmonic signal where the third harmonic stator voltage itself gives information about the air gap flux while the slot harmonic was used to estimate the mechanical speed. Table II (below) shows the experimental and estimated results obtained for Motor #2. The torque estimate, $T_{m,est}$, was computed from Eqs. 7 and 8. Values for the function relating the third harmonic amplitude of the air gap flux and the air gap fundamental flux amplitude expressed by Eq. 8 were derived from the preliminarily acquired machine characteristic data which, as measured, yielded results as presented in FIG. 8. The speed estimation, $w_{r,est.}$, was obtained from the rotor slot ripple, as mentioned before.

machines so that the mechanical load was measurable. The voltage source PWM inverter described herein was modified so that a direct and independent control of both voltage and frequency could be possible. The control software as described previously and illustrated in FIG. 8 was implemented in a development system using a CPU (central processing unit) board commercially obtained from Motorola which utilizes the Digital Signal Processor 56001. Analog to digital (a/d) and digital to analog (d/a) converters were built, as well as an interface circuitry between the controller and the inverter signals. Anti-aliasing low pass filters commercially obtained with cut off frequencies around 10 KHz were installed in each one of the analog to digital converters.

Three channels of a/d were employed to input the line current, third harmonic voltage, and the input power signals. An interface circuit was built to obtain the third harmonic signal. It consisted of an isolation differential amplifier for each one of the stator phase voltages and an adder for the three signals. Independent control of the gain for each one of the isolation amplifiers was chosen in order to guarantee that the three phase voltages had the same amplitude before being added. The input power to the machine was measured via a wattmeter (Yokogawa) which offers an analog output signal proportional to the power measured. The motor stator current was measured by a circuit including a Hall effect sensor.

The traces shown in FIG. 11 were obtained from the efficiency controller thus constructed. From bottom to top, the Figure shows: (i) amplitude of the stator current, (ii) third harmonic voltage signal, (iii) torque measured by the torquemeter, and (iv) torque computed by the efficiency controller. A torque step from rated to zero was applied to the motor at approximately 3 seconds. It is clear that the computed torque follows very well the actual torque variation as measured by the torquemeter. The correlation between the computed

TABLE II

| | | | | Experimental and Estimated Results Obtained From the Third Harmonic Voltage Signal for Motor #2 | | | | |
|---|---|---|---|---|---|---|---|---|
| $P_{in}$ (W) | $T_m$ (N·m) | $\omega_r$ (rpm) | $P_o$ (W) | $\eta$ | $T_{m,est.}$ (N·m) | $\omega_{r,est.}$ (rpm) | $P_{o\,est.}$ (W) | $\eta_{est}$ |
| 6613.00 | 29.82 | 1744.30 | 5447.01 | 0.82 | 29.80 | 1740.28 | 5430.80 | 0.82 |
| 5673.00 | 25.56 | 1753.00 | 4692.16 | 0.83 | 26.17 | 1750.99 | 4799.43 | 0.85 |
| 5049.00 | 22.72 | 1758.70 | 4184.37 | 0.83 | 22.95 | 1756.34 | 4220.18 | 0.84 |
| 4433.00 | 19.88 | 1764.10 | 3672.56 | 0.83 | 20.08 | 1761.70 | 3704.56 | 0.84 |
| 3816.00 | 17.04 | 1770.30 | 3158.97 | 0.83 | 17.32 | 1767.05 | 3204.18 | 0.84 |
| 3227.00 | 14.20 | 1775.20 | 2639.77 | 0.82 | 14.54 | 1772.41 | 2699.47 | 0.84 |
| 2693.00 | 11.36 | 1779.80 | 2117.28 | 0.79 | 12.09 | 1777.76 | 2251.18 | 0.84 |
| 2120.00 | 8.52 | 1784.50 | 1592.16 | 0.75 | 9.08 | 1783.12 | 1696.00 | 0.80 |
| 1559.00 | 5.68 | 1789.00 | 1064.11 | 0.68 | 5.69 | 1788.47 | 1064.74 | 0.68 |
| 994.00 | 2.84 | 1793.30 | 533.34 | 0.54 | 3.32 | 1792.04 | 622.91 | 0.63 |
| 479.00 | 0.00 | 1797.40 | 0.00 | 0.00 | 0.00 | 1797.39 | 0.00 | 0.00 |

The results in Table II demonstrate that the estimated values are very close in the values actually measured demonstrating that the third harmonic signal is highly suitable for purposes of estimating the machine speed, torque, and output power. The measured and estimated mechanical load torques applied to Motor #2 as a function of the speed for a constant frequency of 60 Hz and rated voltage of 220 volts were compared and a very good correlation was obtained.

The indirect type of efficiency controller as depicted in FIG. 6 was implemented for Motor #2. The motor was coupled in line with a direct current dynamometer that served as a controllable mechanical load. A torquemeter (Himmelstein) was installed between the two value and the measured value for the torque was verified for several values of load and it was very good. As FIG. 11 shows, the change that occurs in the amplitude of the third harmonic voltage as the motor load was reduced to zero. The increase in the third harmonic voltage amplitude came from the fact that the saturation level of the machine increases as the motor load decreases.

Study of a more detailed plot for the torque variation shown in FIG. 11 reveals a very small response delay computed torque. It has been verified that delays in the order of 5 to 10 ms occurred for the computed torque with respect to the actual torque variation. This delay is characteristic for this kind of controller since the amplitude of the air gap flux was detected every half cycle of the third harmonic flux signal. Another factor that contributes to this delay was the fact that the angle $\gamma_{im}$ between the current and flux was obtained via a low pass filter which was, in the implementation above, programmed to have a cut off frequency at 10 Hz. This delay was reducible by increasing, for instance, the cut off frequency of the filter used to extract the angle $\gamma_{im}$ information. Some care should be taken in doing so however, because of the low frequency contents present in the input signal $M_y$ to the filter.

Another solution to the problem of detecting the angle $\gamma_{im}$ was implemented and evaluated. It consisted in detecting the zero crossing of both the third harmonic flux and stator current. This solution, unfortunately, did not allow a better measurement for the angle since it was found to be somewhat difficult to obtain an accurate zero crossing detection for current and third harmonic flux. These signals appear to always have some oscillatory components superimposed on them. However, when the switching frequency of the invertor was higher, as it was in the case for the current regulator described below, this solution of estimating th angle $\gamma_{im}$ was found to work well and is presently preferred to the solution utilized in the efficiency controller embodiment.

The operation of the efficiency controller was verified by further tests and traces showing the evolution of the command voltage applied to the inverter, in comparison to the load torque, the actual stator voltage amplitude, and the input power to the motor. This data was obtained for Motor #2 running at rated speed and 3 percent of the rated load. When the efficiency controller started its operation, the motor was running with rated voltage and frequency. The controller then decreased the applied voltage while keeping the torque constant by adjusting the frequency. A minimum input power was reached after approximately 20 seconds, when the reduction in power amounted to about 380 Watts. This was a significant power saving, showing that, for this load condition, the iron losses were very high if the machine was operated with rated flux. Part of the noise noticed in the signals was the result of transient oscillation occurring due to the step changes in the applied stator voltage.

As mentioned earlier, in the sample embodiment, the sampling time used for torque computation was selected to be 50 μs and the voltage command was updated every 400ms. In operation, this meant that the torque regulator used 8,000 samples to perform the proper regulation, while the optimization algorithm, in this particular sample embodiment, took about 50 samples of input power to converge to the minimum value.

The same variables were employed for the condition where the motor was running at rated speed and at 20 percent of rated torque. The efficiency controller was able in this case to reduce the input power by about 127 Watts, while keeping the load torque constant. In this case, it took longer for the voltage command signal to settle down around a constant level. This was because the input power as a function of the voltage and frequency did not have a well pronounced minimum value.

The saving of electrical input power, $P_{in}$, that was obtained as a function of the fundamental component of the applied line voltage for Motor #2 operating at relatively low torque and medium speed (0.6 pu speed and 0.2 pu load torque) was evaluated. The results were obtained from an experimental procedure where the input power $P_{in}$ was measured by a digital wattmeter while the machine mechanical output power was kept constant.

The experimental results for the same motor relate the increase in the machine efficiency as a function of speed for both relatively heavy and light torque loads of 0.8 and 0.2 pu. The efficiency increase was computed with reference to the efficiency obtained when the machine was operating at the same load torque with rated volts per Hertz.

It was observed that when the motor was heavily loaded, efficiency was improved primarily for low speed operation, while, when the motor was lightly loaded, efficiency improvement was obtained at high speeds, due to the change in the optimum balance in iron and copper losses for the two load conditions. A substantial increase in efficiency was achieved at high speeds and low torque suggesting that good induction motor efficiencies are maintained over a wide speed range.

The present invention can also provide an adaptive controller for correction of the rotor time constant used for the calculation of slip frequency in indirect field oriented control (IFOC) of induction machines. Two different embodiments of the controller method and means are provided. This can provide IFOC-type adaptive controllers which are simple, reliable, and independent as much as possible of the induction machine parameters. The adaptive controllers can be retrofitable into existing induction machine systems.

The adaptive controllers depend on one variable, the air gap flux. Thus, in the present invention, a model reference adaptive controller (MRAC) and also a feedforward/predictive feedback controller (FPFC) are provided which are each useful with an induction machine for indirect field oriented control.

The MRAC depends only on a single, easily measurable machine parameter estimate, namely, the magnetizing inductance. Moreover, a correction strategy to compensate for changes in the magnetizing inductance due to changes in the air gap flux level is also provided. Such strategy is based on a function which relates the value of this inductance to the third harmonic voltage amplitude. As a result, the controller is very reliable with regard to dependence on machine parameters. However, the MRAC tends to exhibit high sensitivity to the machine operating condition.

The FPFC utilizes the rotor magnetic flux which is computed from the air gap magnetic flux as estimated from the third harmonic voltage signal. Consequently, this controller is dependent on the rotor leakage inductance which contributes to a certain loss of reliability. Its response, however, characteristically tends to be less sensitive to the machine operating condition than the MRAC.

These controllers do not require any sensors in the air gap of the machine nor complex computations of machine parameters or variables. Only access to the stator neutral connection is necessary in order to estimate the air gap flux.

Both the MRAC and the FPFC IFOC adaptive controllers of this invention utilize the method of estimating the air gap flux and/or rotor flux from the third harmonic component of the stator phase voltages that is provided by this invention. Similarly to what is done in the hereinabove described efficiency controller of this invention, the amplitude of the fundamental air gap flux component, $|\lambda_{am}|$, is first obtained from the amplitude of the third harmonic component of stator voltage, $V_3$ as derived from the integration of the third harmonic stator voltage signal $V_{s3}$ resulting from the summation of the three phase voltages in a three phase induction motor. Then, the amplitude of the fundamental component of the flux linkage is expressed in terms of the third harmonic flux component by the non-linear function of Eq. 8. Values for $|\lambda_{am}|$ are measured for a given machine or machine type. An example of values obtained for this function for one motor is given herein involving simulation and experimental results.

The relative position of the fundamental component of the air gap flux with respect to the stator current is obtained by measuring the phase displacement between two fixed points, one in the third harmonic air gap magnetic flux $T_3$ and the other in the stator line current waveform $i_{ns}$ (see FIG. 2) so that such waveform displacement corresponds to the phase displacement between the maximum values for each of the fundamental components of current $i_{as}$ and air gap flux $\lambda_{am}$.

The fundamental and third harmonic components of the air gap flux, and also the stator current, are depicted in a vector representation in FIG. 4 from which it is clear that the air gap flux is resolvable into its d and q components from a knowledge of its magnitude and the respective angles $\gamma_{im}$ and $\theta_{is}$.

The dependence of the MRAC type of controller on machine parameters is minimizable when a convenient machine variable is chosen. In accord with the present invention, which variable is the air gap magnetic flux, one needs only a knowledge of the magnetizing inductance of the machine to establish an IFOC-type adaptive controller for the rotor time constant.

The MRAC controller utilizes the air gap flux measured from the third harmonic content of the stator voltages for both rotor time constant estimation as well as magnetizing inductance estimation. The air gap magnetic flux so measured is resolved into its d and q components. The d component is utilized in the adaptation scheme for the rotor time constant. The q component is utilized to show the magnitude of the flux or to estimate the magnetizing inductance.

The d-axis component of the air gap flux, which has the same value as the rotor flux when the machine is field oriented, is then computed as shown in Eqs. 1 and 2 above.

The air gap flux d-axis component computed from Eq. 1 above is utilized by the MRAC. FIG. 12 illustrates an embodiment of the MRAC for rotor time constant correction.

The simplicity of the MRAC is striking. It requires only an estimate for the magnetizing inductance, $L_m^*$, in order to set the flux reference value, $\lambda_{dm}^{e*}$, which, together with the flux computed as in Eq. 1 defines a flux error signal, $\Delta\lambda_{dm}^3$. This error is driven to zero by a regulator as the rotor time constant, $T_r^*$, is adjusted to its correct value. The MRAC simplicity is possible only because of the choice for the model output chosen, $\lambda_{dm}$ in this case.

In spite of the simplification obtained, the MRAC still depends on the magnetizing inductance, a parameter that is likely to vary with changes in the machine operating conditions. Variations in the magnetizing inductance are characteristically associated with the air gap flux level which is a function of the stator current d and q components. Therefore, changes in the torque or flux commands produce variations in the air gap flux level, and, consequently, in the magnetizing inductance, especially if the machine operates in the non-linear segment of the magnetization characteristic curve, as is common.

A function has been discovered which relates the actual value of the magnetizing inductance with the magnitude of the third harmonic flux component. This function can be considered to have been obtained from the function relating the fundamental air gap flux amplitude and third harmonic air gap flux amplitude described by $f_\lambda$ in Eq. 8. This function, designated as $f_{Lm}$, is:

$$L_m = f_{Lm}(|\lambda_3|) \qquad (17)$$

This function relating $L_m$ and $|\lambda_3|$ is optionally but preferably incorporated in the MRAC controller in FIG. 12, which is easily accomplished, and the resulting adaptive control scheme becomes independent of variations in the magnetizing inductance. FIG. 13 shows an embodiment of such an IFOC MRAC-type controller for correcting the rotor time constant which incorporates this function.

The performance of the MRAC is demonstrated by plots which show the steady state value of the normalized d-axis component of the air gap flux as a function of the normalized detuning of the rotor time constant for Motor #3, which is characterized below. These quantities are normalized with respect to the values at ideal field orientation condition. Plots for three different values of torque at rated flux are prepared. The results shown demonstrate that the correct value of rotor time constant is always obtained because the $\lambda_{dm}^3$ is not a doubly valued function and because it presents a zero flux error at the correct rotor time constant for all torque conditions. These results also demonstrate that the controller is always stable regarding the direction of change in the rotor time constant.

A possible potential problem for this MRAC-type of controller is its low sensitivity to detuning for low torque conditions. The results of the indicated performance evolution suggest that a low sensitivity to detuning exists when the exemplary machine is running at 10 percent of its rated torque. This could perhaps represent a problem if a correct tuning is desired when operating at light load conditions. A solution for this potential problem is to increase the controller gains which should be done with caution in order not to compromise the dynamic response capability of the entire system of which this controller is a part.

The dynamic response capability of the MRAC is also sensitive to the operating condition of the system. The simulation and experimental results obtained in evaluation of an embodiment of the MRAC show that the MRAC response is a function, for instance, of the direction of change in the rotor time constant. This type of behavior can be explained by the fact that the MRAC, which is implemented with constant controller gains, is actuating in a non-linear system. Consequently, the eigenvalues of the system including the MRAC controller are space variant, changing as the operating conditions of the drive are changed.

Despite these potential problems with sensitivity and variant dynamics, the MRAC presents the very attractive characteristic of being practically independent of machine parameters. The only machine-derived data desirable for its implementation is the function $f_{Lm}$ relating the magnetizing inductance and the amplitude of the third harmonic of the air gap flux. The result is a controller with high reliability. Evaluation results have shown that the MRAC is capable of estimating the correct optimum air gap flux value for a wide range of rotor speeds.

In most practical applications, the detuning of the slip calculator is a result of changes in the rotor resistance which has a thermal time constant that is much larger than any relevant electrical or mechanical time constants in the system. As a result, the variant dynamic response of the MRAC is not necessarily an issue with which to be concerned if stability is guaranteed. Furthermore, in applications where the motor operates close to its rated torque during most of the operating cycle, the potential problem of low sensitivity presented by this controller is not important.

To improve the MRAC sensitivity to detuning at light loads and also its dynamic response, another embodiment of an IFOC adaptive controller is presented, identified as FPFC.

The FPFC generates a rotor flux error which is used as a feedback signal to the controller while the slip frequency calculator generates the feedforward input signal. A principal operational feature of the FPFC is the way in which the error in the rotor flux is related to the error in the slip gain when detuning occurs. The two rotor flux components are affected by any amount of detuning due to changes in the machine parameters, and this error is used to predict the change that occurs in the machine parameters. The derivation for the relationship between the rotor flux error and the changes in the machine parameters follows.

The q-axis rotor voltage can be written as:

$$0 = r_r i_{qr}^3 + p\lambda_{qu}^3 + \omega_s \lambda_{dr}^3 \quad (18)$$

Considering that the detuning is mainly caused by changes in the rotor resistance which occur at a slow rate, the assumption can be made that the term $p\lambda_{qr}^e$ is close to zero. Hence, the foregoing equation above can be rewritten as:

$$0 = r_r i_{qr}^3 + \omega_s \lambda_{dr}^3 \quad (19)$$

The q-axis rotor for flux a non-saturated machine is given by:

$$\lambda_{qr}^3 = L_m i_{qs}^3 + L_r i_{qr}^3 \quad (20)$$

The slip frequency ws from Eq. 19, after substituting ie therewith from Eq. 20, is given by:

$$\omega_s = \frac{L_m}{T_r} i_{qs}^e \lambda_{dr}^{e-1} - \frac{1}{T_r} \lambda_{qr}^e \lambda_{dr}^{e-1} = m i_{qs}^e \lambda_{dr}^{e-1} - n \lambda_{qr}^e \lambda_{dr}^{e-1} \quad (21)$$

With the machine operating under field orientation, the commanded slip frequency $\omega_s^* = \omega_s$, and the estimates of m and n coincide with the actual values for m and n in the Eq. 21 above, as shown by:

$$\omega_s^* = \hat{m} i_{qs}^{e*} \lambda_{dr}^{3*-1} \quad (22)$$

where the q-axis component of the rotor flux is zero.

When a detuning occurs, an error in the parameter estimates appears as well as in the rotor flux components, such that the slip frequency, after identifying the terms that correspond to the definition for $w_s$ can be written as:

$$0 = \Delta m \lambda_{dr}^{e*-1} i_{qs}^3 - \hat{m} \Delta \lambda_{dr}^{3-1} i_{qs}^3 - \hat{n} \lambda_{dr}^{e*-1} \Delta \lambda_{qr}^e \quad (23)$$

Assuming that the actual stator currents follow exactly the references, the division of Eq. 23 by Eq. 22 yields an expression for the error in the slip gain as a function of the error in the rotor flux components, as follows:

$$\frac{\Delta m}{\hat{m}} = \frac{\Delta \lambda_{dr}^e}{\lambda_{dr}^e} + \frac{\Delta \lambda_{qr}^e}{\hat{L}_m i_{qs}^{e*}} \quad (24)$$

Alternatively, the expression for $\Delta m$ above is expressible in terms of the actual d-axis rotor flux instead of its reference value:

$$\frac{\Delta m}{\hat{m}} = \frac{\Delta \lambda_{dr}^{e-1}}{\lambda_{dr}^{e-1}} + \frac{\Delta \lambda_{qr}^e}{\hat{L}_m i_{qs}^{e*}} \quad (25)$$

As a result, the deviation in the parameter estimation represented by $\Delta m$ is readily computed as a function of the error in the d and q components of the rotor flux. This error is used by a controller algorithm to compute the necessary change in the slip gain commanded to the slip frequency calculator. When $\Delta m$ is added to the estimate m, Eq. 22 yields:

$$\omega_s^* = (\hat{m} + \Delta m) i_{qs}^{e*} \lambda_{dr}^{e*-1} = (K_s^* + \Delta K_s) i_{qs}^{e*} \quad (26)$$

where the symbol $K_s^*$ is the rated slip gain computed from Eq. 27, and $K_s$ is its variation obtained from Eq. 25:

$$K_s^* = \hat{m} \lambda_{dr}^{e*-1} = \frac{\hat{L}_m}{T_r^*} \frac{1}{\lambda_{dr}^{e*}} \quad (27)$$

The rotor flux used in Eq. 25 to compute the error in the slip gain error is estimated from a processing of the third harmonic voltage signal. As explained previously herein, the third harmonic stator voltage signal and one of the stator currents are used to estimate the air gap flux d and q components. The rotor flux is then readily computed from these quantities according to:

$$\lambda_{qr}^e = \frac{\hat{L}_r}{\hat{L}_m} \lambda_{qm}^e - \hat{L}_{ir} i_{qs}^e \quad (28)$$

$$\lambda_{dr}^e = \frac{\hat{L}_r}{\hat{L}_m} \lambda_{dm}^e - \hat{L}_{ir} i_{ds}^e \quad (29)$$

Although dependent on machine parameters, the rotor flux is obtainable with reasonable accuracy since the rotor leakage inductance, $L_{lr}$ and the ratio $L_r/L_m$ are only moderately dependent on the saturation level. The rotor flux references needed in the computation of the flux error are simply defined as zero for the q-axis component, and as a constant value for the d-axis component. This last value can be originated from a flux regulator, if desired.

FIG. 14 illustrates an embodiment of an FPFC implemented in an induction machine indirect field orientation system. As for the case of a MRAC, the estimate for the magnetizing inductance is obtained from the amplitude of the third harmonic flux signal. The presence of a feedforward and a feedback loop is apparent from this Figure.

Evaluation results demonstrating an implementation of the FPFC adaptive controller of this invention have been obtained. The induction machine described below as Motor #3 was chosen for these evaluation which included a simulation procedure.

A simulation program was developed as a tool to help in the design and the experimental implementation of an adaptive controller of this invention. Neither speed nor position feedback control was assumed, so that the effects of detuning in the torque response were fully investigated.

Typical simulation traces obtained for Motor #1 were generated. The results included a constant and a rated flux command, and a step increase in the actual rotor resistance of 100 percent from its nominal value. Each set of imposed conditions dealt with a different value of torque command. The changes in the response dynamics of the controller were evident. The results included a rated torque condition, and conditions for 50 percent and 10 percent of that condition. The simulation results show the evolution for each of $T_r^*$, $\lambda_{dm}^e$, $\Delta\lambda_{dm}^e$, and $T_e$, which are, respectively, the rotor time constant, d-axis component of the air gap flux, error in the air gap flux d-axis component, rotor q-axis component, and electromagnetic torque. The traces showed the transient for an increase of 100 percent in the rotor resistance occurring at 0.5 seconds after the beginning of the plot.

The results demonstrated that the machine was working essentially under a field orientation condition up to the instant when the disturbance occurs in the rotor resistance. As soon as the disturbance occurs, the rotor and the air gap flux increased as a consequence of the over excitation produced by the increase in the rotor resistance. The adaptive controller then commanded the rotor time constant to change its new value while driving the air gap magnetic flux error to zero.

The differences in the dynamic response for each case are clearly shown by these results. In particular, the error magnitude of the d-axis component of the air gap flux reduced as the torque command current $i_{qs}^{e*}$ was reduced. Such behavior is characteristic for the MRAC. An indirect rotor flux orientation scheme was implemented using the Motorola DSP 56001 development system. The hardware associated with the DSP was similar to that utilized in the implementation of the efficiency maximizer controller described herein. An Electrocraft converter was modified to operate as a current source PWM inverter. A simple hysteresis regulator was digitally implemented to provide the current regulation for the three stator currents.

The motor used was a wound rotor three phase induction type as described below. It was mechanically coupled to a direct current dynamometer at one end of the shaft, and to an incremental encoder with a resolution of 1,024 pulses per revolution at the other end. An external three phase resistance bank was connected to the rotor terminals so that the actual rotor resistance could be increased to about twice its nominal value.

The design and implementation of the control software in the DSP 56001 was straightforward. The software program consisted of a single loop (no external or timer interrupts were used) that was controlled to run every 100 μs. During each run, two stator current signals and the third harmonic voltage were input into the processor.

An integration of the third harmonic voltage signal was performed so that the third harmonic flux was obtained. The amplitude of this flux component was detected, and the amplitude of the fundamental flux was read from a reference table containing the function $f_{80}$ in Eq. 8. The angle which the current in phase makes as it crosses zero was detected and a flag was kept set until the next crossing for the third harmonic flux was also detected. The subtraction of the two angles yielded the angle $\gamma_{im}$. Zero crossing detection for measuring $\gamma_{im}$ is preferred to the method above described and used in efficiency control because the current and third harmonic signals present less noise in this application than in the case where the motor is driven by a PWM voltage source inverter. Another factor is that the zero crossing angles for current and third harmonic flux are readily available from the synchronous angle $\theta_e$ computed to be used in the reference frame transformation for the stator currents.

Next, the d-axis component of the air gap flux was computed according to Eq. 1. An error signal was then generated from this signal, and its reference value was obtained from the current command $i_{ds}^{e*}$ and a reference table containing the function $f_{Lm}$ as in Eq. 17. A proportional-integral regulator was implemented in order to drive the flux error to zero by changing the rotor time constant estimate $T_r^*$.

The digital implementation of the FFPC has the same basic structure as the implementation of the MRAC described above. In the FFPC controller, the rotor flux d and q components were computed from the corresponding components of the air gap flux and stator current according to Eq. 28 and Eq. 29. The rotor flux references are assumed to be constants computed aside from the controller. The equation for the prediction estimator of the error in the slip gain (Eq. 24) is implemented, and the correct slip gain computed.

The third harmonic stator voltage signal obtained from the summation of the three phase voltages for operation at no load and synchronous frequency around 30 Hz was evaluated. A current regulated PWM inverter was used to supply the induction machine. The summation produced a third harmonic voltage. The switching frequency component in the third harmonic voltage was easily eliminated by a low pass filter (LPF), if desired. Another LPF was preferably used for the current so that the phase displacement between the current and third harmonic voltage was kept exactly at its original value. Points corresponding to the maximum values for the air gap flux and the current are easily identified since the zero crossing for the voltage waveform corresponds to a maximum value for the flux.

For a no-load condition, the phase shift between these two points, which represents the phase shift between the fundamental components of air gap flux and stator mmf, was very small since the mechanical output power developed is only sufficient to overcome the windage and friction losses. As the machine was loaded, this phase shift increased to respond to the mechanical torque required by the load. This signal particularly when filtered was found to be very suitable for analog or digital processing.

The spectrum content of the third harmonic stator voltage signal was analyzed. After the summation of the three phase voltages, all the polyphase components were eliminated and the third harmonic was found to be clearly the dominant component at the lower side of the frequency spectrum. The PWM inverter utilized for these measurements had a variable switching frequency (between 3 and 5 kHz) which can have an amplitude comparable to the amplitude of the third harmonic stator voltage signal, and such should, therefore, preferably be filtered.

The third harmonic voltage signal and the stator current for a condition of zero speed (locked rotor) was evaluated. The synchronous frequency, which for this case was around 0.6 Hz, corresponds to the slip frequency for a torque command of about 0.25pu. The amplitude of the third harmonic voltage was very reduced, but a clear and measurable signal was obtainable. The induction machine in this case was commanded to operate with rated flux. The frequency spectrum for the third harmonic signal then produced, showed that high frequencies of the spectrum were eliminated by a LPF. Although the voltage was of small amplitude, the third harmonic flux had a considerable magnitude, and was capable of estimating the correct air gap flux.

The dynamics of the third harmonic signal illustrate the evolution of the stator current and of the third harmonic voltage, responsive to a step change in the torque command. The amplitude of the voltage dropped to zero as the frequency reached zero during the speed reversal. One could conclude that detection of the angle between the air gap flux and the stator mmf is difficult to identify when such transients occur.

The relationship between the air gap fundamental flux component, $|\lambda_{am}|$, and the air gap third harmonic flux component, $|\lambda_3|$, as obtained from the stator third harmonic voltage was evaluated. A reference table containing this function was used by the control software of both adaptive controller embodiments which as built were able to estimate the amplitude of the fundamental air gap flux.

The relation existing between the magnetizing inductance value and the amplitude of the third harmonic flux component was studied. These results were obtained for Motor #3 with a sinusoidal voltage supply at rated frequency and at no-load. This function, when implemented in the control software, allowed the estimation of the magnetizing inductance of the machine operating at different flux levels.

The operation of the MRAC in correcting variations of the actual rotor resistance for Motor #3 was evaluated and the performance verified. Rated torque and flux commands were used while the motor was loaded by a direct current dynamometer. A step change in the rotor resistance from nominal to twice nominal was applied to the motor by changing the external resistance connected to the rotor terminals. After the system response to this change, another step change was applied, so that the nominal rotor resistance was reestablished. Slip gain, error for the d-axis component of the air gap flux, d-axis component of the air gap flux, and rotor speed were examined in a simultaneous time frame. The increase in the rotor resistance occurred at the first time division when a change in the speed and flux components occurred. After approximately 10 seconds, the error in flux was reduced to zero as the d-axis component of the air gap flux returned to its original value prior to the disturbance. The MRAC then commanded a slip gain twice as large as its nominal value, so that the motor kept the condition of field orientation and speed and torque returned to their original values.

It was clear that the correction action of the adaptive controller has different dynamics when the rotor resistance was decreased to its nominal value. The error in flux was larger when the rotor resistance gets lower than its estimate. The non-linear behavior of the system was also made clear by the type of response achieved to a reduction of the rotor resistance. The system in this case was able to correct the slip gain in about 2 seconds, and almost no speed transients were observed.

The same variables as previously identified were employed for a condition of 50 percent of torque and rated flux commands. A difference in the dynamic responses for these two respective operation conditions was observed. At half rated torque, the flux error had a somewhat lower magnitude than the error in the rated torque. The response time for the controller to achieve the correct slip gain was somewhat shorter than for the half loaded case. The disturbance of the speed was considerably less than in the previous MRAC operation.

Evaluation results for the FPFC were also obtained from a constructed system. The slip gain, the q-axis component of the rotor flux, and d-axis component of the rotor flux, and mechanical speed were studied in a simultaneous timeframe. These data were taken for Motor #3 running at rated torque and rated flux. As in the previous case, the motor was coupled to a dynamometer. Again, the rotor resistance was doubled initially and then had its value returned to the nominal value (both step changes). The correction for the slip gain was very fast, taking less than two seconds for the controller to command the correct slip gain. As before, the response of the system for the two changes of the rotor resistance was different. This difference, as in the case for the MRAC, is a consequence of the non-linearity introduced into the controller when the rotor resistance changes.

The independence of the controller response with changes in the operating condition of the machine was verified from the data obtained which showed the same changes in the rotor resistance s in the preceding case, but at a condition of rated flux and 50 percent of torque. The response dynamics were only slightly changed from the constructed FPFC system.

Adaptation of the slip gain at zero speed (locked rotor) was possible with the RPFC as the data showed for a condition where Motor #3 was driven at rated torque and at rated flux values. The same variables as indicated above were used for the same amount of change in the rotor resistance as for the above cases.

The FPFC system has an excellent response characteristic which is better than that achieved by the MRAC operating at the same conditions. The observed results demonstrate that the third harmonic component of the stator voltage signal is utilizable for accurately estimating the rotor flux even at zero speeds.

The error generated in the rotor flux components and the type of responses achieved in this operating condition were essentially the same as for the case shown in the constructed FPFC system described above.

Thus, the MRAC corrects the rotor time constant from the error in the d-axis component of the air gap flux while the FPFC eliminates rotor flux disturbances by commanding the correct slip gain which is predicted from previous states of the machine.

The stator voltage third harmonic component is used to determine the resulting position and amplitude of the fundamental component of the air gap magnetic flux, and this air gap flux is resolved into its d-axis and q-axis components. The d-axis component of the flux is then used in the MRAC as a control signal for the adaptation of the rotor time constant. The FPFC requires computation of the rotor flux which is accomplished from the air gap flux and stator current components. These two control implementations each require a knowledge of the machine magnetizing inductance which cannot be considered a constant under practical circumstances. Therefore, a correction strategy for changes in the magnetizing inductance occurring with flux level is preferably implemented in both controllers. This correction strategy is based on a function relating the value of the inductance with the amplitude of the third harmonic flux signal.

From the evaluation results, it is concluded that the FPFC type of controller has a somewhat better performance at low speed than the MRAC; thus; even for zero speed, it works very well. Its response, however, to disturbances occurring at low levels of torque is not significantly better than for the MRAC-type of controller.

Dependence on the machine saturation level is a characteristic of both these two IFOC controller embodiments since they work properly only if a third harmonic stator voltage is produced by the saturation of the stator and rotor teeth. At reduced flux levels, the third harmonic signal becomes small and eventually disappears. The range of flux in which these controllers can be utilized is a function of the design of the motor being used. High efficiency motors, for instance, are designed to operate with reduced flux levels, and lower third harmonic voltages are expected.

The present invention can also provide a direct field orientation controller for induction machines which utilizes the localization of the air gap flux from the third harmonic voltage component of the stator phase voltages.

This controller utilizes the circumstance that space saturation harmonic components, rotating at synchronous frequency, are generated in the air gap flux when the induction machine operates under saturation condition. These flux harmonic components are responsible for induction of stator phase voltages, and when the machine is wye connected, the sum of the three phase voltages results in a signal dominated by the third harmonic and a high frequency component due to the above described rotor slot ripple. Two controller embodiments for locating the rotor flux from the third harmonic voltage signal for the purpose of achieving rotor field orientation are provided.

Determination of the absolute position of the air gap or rotor fluxes from the third harmonic component of stator voltage presents the problems that the third harmonic signal gives information about only one of the flux components (either the d or the q component). Two methods for rotor field orientation are here provided which circumvent this problem. The first method computes the absolute position from the third harmonic signal with the use of a quadrature oscillator, or the like. The second method achieves rotor field orientation by forcing the alignment of the rotor flux with the d-axis of the d-q plane defined by the stator current components.

This second method is implemented in a simulation and the results demonstrate that the system torque response for transient and steady state regimes are adequate for this low cost implementation solution of direct field orientation control.

With the phases of the induction motor connected in star without a neutral connection, no zero sequence components (triple harmonics in a three phase system) will exist in the current. As discussed above, a function relating the third harmonic stator voltage and the air gap voltage has been discovered and it is used to determine the fundamental air gap flux linkage of the machine, $\lambda_{am}$.

Computation is necessary in order to obtain the rotor flux from the air gap flux, as described by Eqs. 28 and 29 (above). These equations are written in the synchronous reference frame which is the reason for the superscript e. Although dependent on machine parameters, the rotor flux can be obtained with reasonable accuracy since the rotor leakage inductance, $L_{lr}$, and the ratio $L_r/L_m$ are only moderately dependent on the saturation level. Therefore, the rotor flux d-q components are readily obtained from a knowledge of the stator current components, the air gap flux, which is measured from the stator third harmonic signal, and the motor inductance parameters.

A practical problem which arises when implementing the rotor flux orientation control scheme comes from the fact that the air gap flux is not absolutely located by the third harmonic voltage signal which comprises information concerning only the sine or cosine component of the air gap flux (the d or the q component). Therefore, it is necessary to extend the control methodology to obtain the two quadrature components of the air gap flux.

As FIG. 2 shows, the air gap fundamental and third harmonic components together with one of the stator line currents for a loaded motor are interrelated. Clearly point P in the third harmonic wave locates the maximum of the fundamental component of the air flux (point A) which can then be referred to the stator current maximum value (point C) by the angle displacement $\gamma_{im}$. Hence, by detecting point A and measuring the angle $\gamma_{im}$, the absolute position of fundamental air gap flux component is known. A quadrature oscillator is constructed or purchased commercially and synchronized to the point P in the third harmonic voltage signal by means of the angle $V_{im}$. Therefore, from the third harmonic voltage signal, $V_{s3}$, one can readily obtain sine and cosine signals whose arguments, $\theta_f$, correspond to the instantaneous position of the air gap third harmonic flux $\lambda_3$. The rotor flux is then determined as in Eqs. 28 and 29 and a direct rotor field orientation controller shown in block diagrammatic form in FIG. 15 can be implemented.

In this controller, the third harmonic flux signal is obtained from the third harmonic voltage signal by means of a conventional integrator. This signal together with the stator current allows the measurement of the angular displacement $\gamma_{im}$. The amplitude of the third harmonic flux component and the angle $\gamma_{im}$ are the input signals to the quadrature oscillator which generates the d and q components of the fundamental air gap flux.

Another controller embodiment which solves the problem of locating the rotor flux from the third harmonic air gap flux involves the relative positions of the stator current, the air gap flux, and the rotor flux vectors, as shown in FIG. 3. When such vectors are in the synchronous reference frame, they can be interpreted as phase quantities. Given the current commands $i_{qs}^{e*}$ and $i_{ds}^{e*}$, the current vector amplitude $i_s$ and the angle $\theta_{is}$ are computed. With the angle $\gamma_{im}$ defined and measured as indicated in FIG. 3, the air gap flux components are determined from the Eq. 4 and $$\lambda_{qm}{}^e = |\lambda_{am}{}^e| \cos(\theta_{is}+\gamma_{im}) = f_\lambda(|\lambda_3{}^e|) \cos(\theta_{is}+\gamma_{im}) \quad (30)$$

where $f_\lambda$ is the function relating the amplitudes of the fundamental and third harmonic air gap flux components as above discussed herein. The rotor flux components are then obtained from these equations and the stator current components are obtained from the Eqs. 28 and 29.

In rotor field orientation condition, the rotor flux is aligned with the d-axis when the q-axis rotor flux component and the rotor flux angle $\delta$ as shown in FIG. 3 become zero. The rotor flux orientation is then achieved by driving, for instance, the rotor flux angle $\delta$ to zero by controlling the synchronous frequency, $w_e$, applied to the transformation of the stator reference currents from the synchronous to the stationary reference frame. Changes in this frequency accelerate or decelerate the current vector such that the angle $\delta$ is driven to zero. Moreover, since the d and q-axis are fixed in the current components, driving the angle $\delta$ to zero has the same effect as orienting the rotor flux with respect to the d-axis which is the objective for achieving rotor field orientation.

As for the present control methods, a non-ideal torque response is characteristic for both controllers since delays in computing the air gap flux amplitude, and in the angle between current and flux are unavoidable. The first method identified hereinabove presents more delays than the second method due to the time constants associated with the quadrature oscillator utilized to generate the absolute position of the rotor flux.

A presently preferred controller embodiment is shown in FIG. 16. A proportional-integral regulator is used to drive the error in the rotor angle $\delta$, to zero. The output of the regulator is added to the mechanical speed generating the synchronous frequency which is integrated to generate the angle $\theta_e$ used in the transformation of the stator current references. The output of the regulator can be viewed as a slip frequency value.

Speed control can be implemented without the need of an external speed sensor, as shown in the FIG. 16 embodiment. The rotor slot ripple signal, $v_{slot}$, which modulates the third harmonic voltage signal, is isolated from it by means of a band pass filter having a variable center frequency. A switched capacitor filter controller by the synchronous frequency $w_e$ is utilized for this end, with the speed of the machine being given by the expression:

$$w_r = \frac{w_{slot} - w_e}{n_r} \quad (31)$$

where
$w_r$ = rotor speed in electrical rd/s
$w_{slot}$ = slot ripple frequency in rd/s
$n_r$ = number of rotor bars The direct field oriented controller presented in FIG. 16 is implemented in a digital simulation program. The results shown here are obtained for Motor #1 driving a load with twice the motor inertia. The spectrum components from the third harmonic stator voltage signal were obtained when the machine is driven by a current regulated (PWM) pulse width modulator inverter. From that data it was verified that the third harmonic is the dominating component followed by the inverter switching frequency and rotor slot ripple.

Simulation results from the direct rotor field orientation controller proposed in FIG. 16 for the torque current component, $i_{qs}{}^{e*}$, torque, rotor q-axis component, and the rotor angle $\delta$ were obtained It was found that the system transient behavior is very good, especially as regards the torque transient response. In this simulation, the rotor angle was driven to zero in about 0.3 seconds after the change in the torque command. This time was approximately the time required for the torque to reach the correct value when the machine regains the condition of rotor flux orientation.

Thus, a simple, low cost controller for induction machine field orientation control is provided which utilizes the locating of the air gap flux from the third harmonic voltage component induced in the stator phase voltages when the machine is under saturation condition. When the stator phase voltages are summed, the resultant signal contains a dominant third harmonic component followed by the rotor slot ripple which is usable for purposes of speed control.

Two embodiments utilizing the third harmonic voltage signal are provided. The first one uses the third harmonic signal to locate the air gap flux position in absolute terms which is somewhat difficult to achieve due to the fact that no quadrature signal is directly obtainable from the third harmonic signal. The second one avoids the problem of finding the absolute rotor flux position by driving the rotor flux angle with respect to the d-axis to zero, thereby achieving the rotor field orientation condition. Limitations in the torque transient response exist due to the delays introduced by the computation of the flux amplitude and angle measurement. The second method is preferred because of its simplicity and less delay. In FIGS. 12 through 16, the following legends are used:

| Block No. | Block Function |
| --- | --- |
| 50 | Computer computes the angle $\gamma_{im}$ and the value of $\lambda_3$. Can contain a comparator of $i_{as}$ and $V_{s3}$ to measure $\gamma_{im}$. Can also contain a filter and integrator for $v_{s3}$ so that $\lambda_{m3}$ and $|\lambda_3|$ can be computed. |
| 51 | Computer computes function $f_\lambda$ implemented through an incorporated look-up table. |
| 52 | Computer computes angle $\theta_{is}$ and sin ($\theta_{is} - \gamma_{im}$). |
| 53 | Flux regulator can be a PI controller implemented in software. |
| 54 | An integrator can compute angle $\theta_e$ from $w_e$ where: $\theta_e = \int w_e dt$ |
| 55 | Computer accomplishes the transformation of variables from d-q synchronous reference frame to phase variables in abc reference frame. |
| 56 | Reference base. Supplies value of magnetizing inductance. |
| 57 | Computer. Calculates the value of $f_{Lm}$ as implemented with a reference table so that $L_m*$ is computed from $|\lambda_3|$. $f_{Lm}$ is measured experimentally from the function $f_\lambda$. The magnetizing inductance is computed for each value of $|\lambda_{rm}|$ and $|\lambda_3|$ from a reference table wherein such values are referenced to values for $|\lambda_3|$. |
| 58 | An integrator. Integrates $V_{s3}$ to produce $\lambda_3$. |
| 59 | An integrator. Integrates $w_e$ to produce $\theta_e$. |
| 60 | A regulator. Can be a PI controller implemented in software. |

EMBODIMENTS

The following equipment was utilized in the exemplary embodiments above described and evaluated.

1. Motor #1 was rated at 3.0-hp (horsepower) and was obtained from U.S. Electrical Company. Data on this motor is as follows:

TABLE A-1

| DATA FOR MOTOR #1 | | |
|---|---|---|
| Quantity | Symbol | Value |
| Line Voltage | Vl | 220 V rms |
| Output Power | $P_o$ | 3.0-hp |
| Speed | $w_r$ | 1740 rpm |
| Poles | P | 4 |
| Frame | — | 182T |
| Stator resistance | $r_s$ | 1.11 Ω |
| Rotor resistance | $r_r$ | 0.47 Ω |
| Stator leakage reactance | $X_{ls}$ | 1.05 Ω |
| Rotor leakage reactance | $X_{lr}$ | 1.05 Ω |
| Unsaturated magnetizing reactance | $X_m$ | 22.09 Ω |
| Rotor inertia | $J_m$ | 0.0104 Kg-m² |
| Number of rotor slots | $n_r$ | 46 |
| Number of stator slots | $n_s$ | 36 |
| Air gap length | $g_o$ | 0.4165 mm |
| Rotor skew | — | 1 slot |
| Stator pole pitch | $\tau_s$ | 7/9 |
| Rotor stack length | $l_m$ | 65.40 mm |

2. Motor #2 was rated at 7.5-hp and was obtained from Baldor Company. Data on this motor is as follows:

TABLE A-2

| DATA FOR MOTOR #2 | | |
|---|---|---|
| Quantity | Symbol | Value |
| Line Voltage | Vl | 230 V rms |
| Output Power | $P_o$ | 7.5-hp |
| Speed | $w_r$ | 1750 rpm |
| Poles | P | 4 |
| Frame | — | 924M |
| Stator resistance | $r_s$ | 0.210 Ω |
| Rotor resistance | $r_r$ | 0.193 Ω |
| Stator leakage reactance | $X_{ls}$ | 0.698 Ω |
| Rotor leakage reactance | $X_{lr}$ | 0.698 Ω |
| Unsaturated magnetizing reactance | $X_m$ | 16.95 Ω |
| Rotor inertia | $J_m$ | 0.041 Kg-m² |
| Number of rotor slots | $n_r$ | 48 |
| Number of stator slots | $n_s$ | 36 |
| Air gap length | $g_o$ | 0.558 mm |
| Rotor skew | — | none |
| Stator pole pitch | $\tau_s$ | 7/9 |
| Rotor stack length | $l_m$ | 79.91 mm |

3. Motor #3 was rated at ⅜-hp and was obtained from Wagner-Leland. Data on this motor is as follows:

TABLE A-3

| DATA FOR MOTOR #3 | | |
|---|---|---|
| Quantity | Symbol | Value |
| Line Voltage | Vl | 220 V rms |
| Output Power | $P_o$ | ⅜-hp |
| Speed | $w_r$ | 1725 rpm |
| Poles | P | 4 |
| Frame | — | 56T60 |
| Stator resistance | $r_s$ | 7.15 Ω |
| Rotor resistance | $r_r$ | 6.0 Ω |
| Stator leakage reactance | $X_{ls}$ | 5.14 Ω |
| Rotor leakage reactance | $X_{lr}$ | 3.23 Ω |
| Unsaturated magnetizing reactance | $X_m$ | 100.65 Ω |
| Rotor inertia | $J_m$ | 0.022 Kg-m² |
| Number of rotor slots | $n_r$ | 33 |
| Number of stator slots | $n_s$ | 36 |
| Air gap length | $g_o$ | 1.28 mm |
| Rotor skew | — | 1 slot |
| Stator pole pitch | $\tau_s$ | 7/9 |
| Rotor stack length | $l_m$ | 46.18 mm |

4. The inverter characteristics are as follows

| Characteristics | Value |
|---|---|
| Manufacturer - Emerson Industrial Controls | |
| Model - Laser 1 series | |
| Chasis part number | 2950-8402 |
| Input ac max. voltage | 480 V |
| Input ac max. current | 47.8 A |
| Output ac max. voltage | 460 V |
| Output ac max. current | 30.2 A |
| Output frequency | 6-120 Hz |
| Output power | 20-hp |
| Switching frequency | 1.2-2.0 kHz |

Although the invention has been described with reference to particular embodiments, it should be understood that many variations and modifications will be apparent to those skilled in the art. The scope of this invention is not limited by the foregoing specific embodiments.

What is claimed is:

1. A method of maximizing the efficiency of an alternating current machine having stator means with windings, rotor means and an air gap therebetween and whose stator windings are energized by a variable frequency multiphase power source, said method comprising the steps of:

(a) determining the fundamental air gap magnetic flux from the third harmonic component of said machine stator voltage;

(b) calculating from said fundamental air gap magnetic flux and from information derived from the machine stator current a value representative of the output power of said machine;

(c) measuring the input power being fed into the machine; and (d) using said output power and said input power to calculate control values for regulating the voltage and the frequency of said input power so that said input power is maintained at a desired value.

2. The method of claim 1 wherein said maintaining is carried out by feeding said control values to an invertor which supplies power to said machine.

3. The method of claim 1 wherein a substantially constant speed for said machine is maintained.

4. The method of claim 1 wherein a substantially constant torque for said machine is maintained.

5. The method of claim 1 wherein the magnitude of said fundamental air gap magnetic flux is calculated from the magnitude of the third harmonic component of said air gap magnetic flux which is calculated from the third harmonic component of said stator voltage.

6. The method of claim 1 wherein the rotation speed of said rotor means is used to calculate said output power and said rotation speed is computed from harmonic components of said stator voltage.

7. A method of maximizing the efficiency of an alternating current machine having stator means with windings, rotor means and an air gap therebetween and whose stator windings are energized by a variable frequency multiphase power source, said method comprising the steps of:

(a) determining the third harmonic component of the stator voltages, calculating the third harmonic component of the air gap magnetic flux from the third harmonic component of the stator voltages and calculating the magnitude of the fundamental component of said air gap magnetic flux from said third harmonic component of said air gap magnetic flux;

(b) measuring the amplitude of a representative stator current;

(c) measuring the phase angle between a fundamental component of the stator current and the third harmonic component of said air gap flux;

(d) calculating the torque of the machine from said representative stator current, said magnitude of said fundamental air gap magnetic flux and said phase angle;

(e) utilizing harmonic components higher than said third harmonic component of said stator voltages to determine the speed of the rotor means;

(f) calculating the output power of said machine from said rotor speed and said torque;

(g) measuring the input electrical power for said machine;

(h) feeding said input power and said output power into a processor to calculate optimized values for the voltage and for the frequency to be used for said input power to maintain said input power at a minimum value relative to said output power;

(i) converting said optimized values into signals for controlling said input power; and (j) controlling said input power voltage and input power frequency with said signals.

8. An apparatus for maximizing the efficiency of an alternating current machine having stator means with windings, rotor means and an air gap therebetween comprising in combination:

(a) means for determining the third harmonic component of said machine stator voltage;

(b) means for determining the value of the fundamental air gap magnetic flux from said third harmonic component of said stator voltage;

(c) means for calculating a value representative of the output power of said machine using said fundamental air gap magnetic flux;

(d) means for calculating the input power being fed to said machine;

(e) means for comparing said input power and said output power and for generating a signal representative of the difference therebetween;

(f) means for generating from said difference signal at least one voltage control signal for regulating the frequency and voltage of said input power at levels which are adapted to maintain said input power at a desired value sufficient to maintain said output power; and (g) means for adjusting said input power using said control signals to achieve said input power desired value.

9. An apparatus for maximizing the efficiency of an alternating current machine having stator means, rotor means and an air gap therebetween, said apparatus comprising in combination:

(a) means for determining the values of the fundamental air gap flux from the third harmonic component of the stator voltages;

(b) means for determining the speed of the rotor means;

(c) means for determining the torque of the rotor means using the values of said fundamental air gap flux;

(d) means for calculating the output power of the machine from said rotor means speed and said torque;

(e) means for calculating the input power being fed to the machine;

(f) means for comparing said input power and said output power and for generating a signal representative of the difference therebetween;

(g) means for generating from said difference signal a voltage control signal for regulating the voltage of said input power and a frequency control signal for regulating the frequency of said input power, said voltage and said frequency control signals being at levels which maintain said input power at a minimum value sufficient to maintain said output power; and (h) means for adjusting said input power using said control signals to achieve said input power minimum value.

10. A method for indirect field oriented control of slip frequency in an operating multiphase induction machine having a stator, a rotor, and an air gap therebetween, the method comprising the steps of:

(a) determining the amplitude of the fundamental component of the air gap flux and the phase displacement between the fundamental components of each of the air gap flux and a stator phase current;

(b) determining the direct component of the air gap flux from the amplitude thereof;

(c) estimating the slip gain error from an estimated value of the magnetizing inductance and the direct component of said air gap flux;

(d) calculating a corrected value of the rotor time constant from said slip gain error;

(e) calculating the controlling slip frequency angular speed from said corrected value for the rotor time constant;

(f) adding said controlling slip frequency angular speed to the rotor speed to produce a control angular speed value; and (g) inputting the control angular speed and the quadrative value of the current component of the machine input power into a regulating means through which said machine input power passes before entering said machine, thereby to control said machine slip frequency of said machine.

11. A method for controlling rotor field orientation in a multiphase induction machine having a stator, a rotor, and an air gap therebetween, said method comprising the steps of:

(a) determining the third harmonic component of the air gap flux from the third harmonic component of said machine stator phase voltage;

(b) determining the maximum value of the fundamental component of the air gap flux from the third harmonic flux component;

(c) measuring the phase angle between the maximum value of the stator current and the maximum value of said fundamental flux component;

(d) passing said phase angle and the maximum value of said third harmonic flux component through a quadrature oscillator means which produces direct and quatrature components of the fundamental component of the air gap flux;

(e) computing the rotor flux from said direct and quadrature components;

(f) comparing said computed rotor flux to a reference motor flux, thereby generating a phase angle value which represents the difference between the fully oriented rotor field orientation and the actual rotor field orientation;

(g) inputting said phase angle signal into a regulator means along with reference signals for the direct and quadrature values of current being input into said machine, thereby generating current values for each phase of said machine; and (h) charging said current values into a current regulator from which power is fed to said machine, thereby regulating input power to control rotor field orientation.

12. An apparatus for controlling rotor field orientation in a multiphase induction machine having a stator, a rotor, and an air gap therebetween, said apparatus comprising in combustion:

(a) means for determining the third harmonic component of the air gap flux from the third harmonic component of the machine stator phase voltage;

(b) means for determining the maximum value of the fundamental component of the air gap flux from said third harmonic flux component;

(c) means for measuring the phase angle between the maximum value of the stator current and the maximum value of said fundamental flux component;

(d) means for passing said phase angle and the maximum value of said third harmonic flux component through a quadrature oscillator means which produces direct and quadrature components of the fundamental component of the air gap flux;

(e) means for computing the rotor flux from values for the direct and quadrature components of the fundamental component of air gap flux and for identifying rotor field orientation;

(f) means for comparing said rotor to field orientation to a desired rotor field orientation and for generating an output signal representation of such composition; and (g) means for regulating input current and frequency thereof to said machine, thereby to control rotor field orientation.

13. A method for indirectly determining a fundamental component of the air gap magnetic flux in an operating multi-phase alternating current machine for regulating the operation efficiency thereof, said machine having stator means with a plurality of stator windings, rotor means and an air gap therebetween, said stator windings being energized by a variable frequency, multiple-phase input power source, said method comprising the steps of:

(a) measuring a harmonic component of the machine stator voltage by summing the machine stator phase voltages to determine the magnitude of said fundamental component of said air gap magnetic flux from said measured stator harmonic voltage component;

(b) determining a value representative of the output power of said machine, said value being derived from (1) information associated with the machine stator current, (2) said magnitude of said fundamental component of said air gap magnetic flux and (3) a phase angle between said stator current and said harmonic component of said air gap magnetic flux; and (c) feeding both input power form said input power source and said so determined value representative of said output power into a processor which is functionally associated with said machine whereby said operating efficiency is regulated.

14. The method of claim 13 wherein the harmonic component of the air gap magnetic flux is the third harmonic component.

15. The method of claim 13 wherein said machine is a three phase induction rotor.

16. The method of claim 13 wherein the rotational speed of said rotor means is computed from harmonic components of said summed stator voltage which are higher in frequency than said third harmonic component of said stator voltage.

17. The method of claim 13 wherein a representative stator current is measured concurrently with said measuring of said third harmonic component of said summed stator voltage, and said representative stator current is compared with a calculated third harmonic component of said air gap magnetic flux to determine the phase angle therebetween.

18. The method of claim 13 wherein the torque of said machine is computed from the equation:

$$T = \frac{3P}{4} |i_{as}| |\lambda_{am}| \sin\gamma_{im}$$

where:

$|i_{as}|$ is the amplitude of a representative stator current, $|\lambda_{am}|$ is the magnitude of the fundamental component of the air gap magnetic flux, $\gamma_{im}$ is said phase angle between said stator current and said third harmonic component of said air gap magnetic flux, P is the number of poles, and T is said torque.

* * * * *